(12) United States Patent
Freier

(10) Patent No.: US 7,801,716 B2
(45) Date of Patent: Sep. 21, 2010

(54) COMPUTERIZED MODELING FOR DESIGN AND EVALUATION OF ORGANIC LIGHT EMITTING DIODES

(75) Inventor: David G. Freier, St. Paul, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 1087 days.

(21) Appl. No.: 11/290,767

(22) Filed: Nov. 30, 2005

(65) Prior Publication Data

US 2007/0124121 A1    May 31, 2007

(51) Int. Cl.
  *G06F 17/50* (2006.01)
  *G06F 17/10* (2006.01)
(52) U.S. Cl. .............................. 703/13; 703/2
(58) Field of Classification Search .................. 703/13, 703/2
  See application file for complete search history.

(56) References Cited

U.S. PATENT DOCUMENTS 6,777,871 B2    8/2004  Duggal et al.

2004/0007969 A1    1/2004  Lu et al.

OTHER PUBLICATIONS

Prentice, Coherent, partially coherent and incoherent light absorption in thin-film multilayer structures; 2000 J. Phys. D: Appl. Phys. 33 3139 (http://iopscience.iop.org/0022-3727/33/24/302); pp. 3139-3145.*
Siegman; LASERS, pp. 179-180, 1986, University Science Books.*
"Application of radiative transport theory to light extraction from organic light emitting diodes", *Journal of Applied Physics*, vol. 95, No. 5, Mar. 1, 2004.
Wen-Jiang Yang, Stimulation and Optimization of OLED Device:, IDS 2002, Hiroshima, 2002 see abstract; p. 4.

* cited by examiner

*Primary Examiner*—Hugh Jones

(57) ABSTRACT

A computer-implemented model for use in predicting the efficiency of light emission from constructions of organic light-emitting diodes (OLEDs). The model, as implemented using computer processing, provides essentially-exact solutions to the behavior of light in the sandwiched layers and the encapsulant of the constructions, and it can predict nearly exactly the overall efficiency of device emission relative to the quantum efficiency of emission, as well as the angular distribution of light emitted by the device. Use of the computer-implemented modeling thus eliminates the need to build and evaluate each and every design as a physical prototype.

3 Claims, 17 Drawing Sheets

Flat Glass

BEF in Optical Contact

COMPUTERIZED MODELING FOR DESIGN AND EVALUATION OF ORGANIC LIGHT EMITTING DIODES

TECHNICAL FIELD

The present invention relates to an apparatus and method for performing modeling for organic light emitting diodes (OLEDs) for use in design and evaluation of such devices.

BACKGROUND

In most current bottom-emitting OLED constructions, twenty percent or less of the light generated within the light-emitting layer eventually escapes the device to become visually useful. This inefficiency usually results in the application of higher voltages to achieve satisfactory brightness, at the expense of decreased lifetimes. Constructing actual devices for determining performance based upon various constructions is usually an expensive and time-consuming process. Computer modeling of devices is available using software programs. However, current modeling programs are limited in terms of the variables and parameters they can process, resulting in substantially less than ideal prediction of how the actual devices will perform.

SUMMARY

A first computer-implemented method and apparatus, consistent with the present invention, can be used to determine an indication of device performance based upon a computerized model. The method and apparatus receive input values of parameters relating to construction of an organic light emitting diode, and they process the input values according to a model in order to determine an overall efficiency of the construction and an angular distribution of emission into air at an air interface of the construction. Values are generated providing an indication of the overall efficiency and the angular distribution of emission into air for the particular construction evaluated.

A second computer-implemented method and apparatus, consistent with the present invention, can also be used to determine an indication of device performance based upon a computerized model. The method and apparatus receive input values of parameters relating to a plurality of construction features of an organic light emitting diode. They process the input values according to a model in order to determine an overall efficiency of the construction and an indication of how at least one of the parameters affects the overall efficiency of the construction. Values are generated providing an indication of the overall efficiency and the indication of how the least one parameter affects the overall efficiency. This method and apparatus can be used to determine a design, based upon the parameters, that optimizes the overall efficiency of the device construction.

BRIEF DESCRIPTION OF DRAWINGS

The accompanying drawings are incorporated in and constitute a part of this specification and, together with the description, explain the advantages and principles of the invention. In the drawings.

DETAILED DESCRIPTION

Overview

Figure 1:
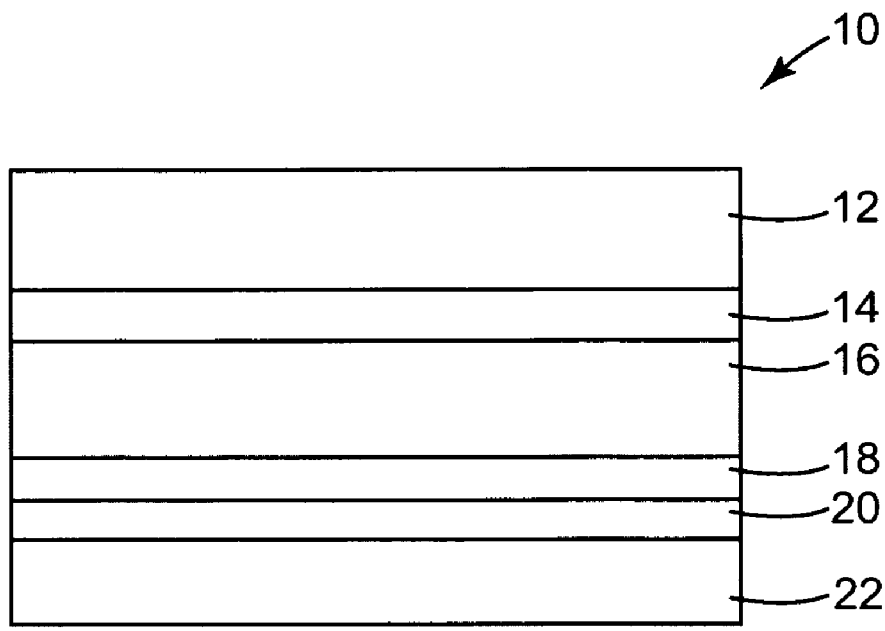
FIG. 1 is a diagram illustrating an example of an OLED emission stack for use in computerized OLED modeling.

Embodiments consistent with the present invention include a computer-implemented mathematical model which predicts the efficiency of light emission from OLEDs. The subject OLEDs for computerized modeling and evaluation comprise any arrangement of 1) incoherent oscillating molecular dipoles, embedded within 2) a layered-index medium, sandwiched between 3) an electromagnetically-thick opaque cathode and an electromagnetically-thick transparent encapsulant; the encapsulant may incorporate 4) any embedded incoherent scatterers, 5) any structure at the air interface (on scales large compared to an optical wavelength), and 6) any parasitic film applied to the exterior surface (with or without an air gap). The computerized model provides essentially-exact solutions to established exact theoretical descriptions of the behavior of light in the sandwiched layers and the encapsulant. It is therefore capable of predicting nearly exactly the overall efficiency of device emission (relative to the quantum efficiency of emission), as well as the angular distribution of light emitted by the device.

The computerized model can be used, in particular, for evaluation of bottom-emitting OLEDs for general illumination or large-format display applications. The bottom-emitting OLEDs incorporate simultaneously a layered emission stack designed to maximize the efficiency of stack emission, random diffuse scattering elements within the transparent encapsulant in combination with a highly reflective cathode and low-loss emission stack to maximize the efficiency of encapsulant/air coupling via diffuse recycling, and optionally one or more overlying prismatic films for on-axis gain enhancement.

No other known model of OLED emission is capable of simultaneously considering all of the aspects of design enumerated above (numbers 1 through 6) while accomplishing exact evaluations of the efficiency and the angular distribution of emission. Embodiments consistent with the present invention thus provide for completing exact and efficient, or essentially-exact, component evaluations, and the integration of these to create a systems model.

Certain embodiments can be implemented as a computerized desktop design tool. Using the computerized model, the efficiency of candidate designs can be evaluated on a computer far more quickly, less expensively, and with less uncertainty than is possible via fabrication and testing of samples in the laboratory. Furthermore, intermediate performance characteristics, which cannot easily be probed experimentally (for example, the angular distribution of radiance within the encapsulant), are easily discerned using the computerized model.

The computerized model has many specific uses advantageous for device design. For example, it can be used for design optimization via exhaustive mapping of the dependence of efficiency upon a multitude of design variables. In particular, using the computerized model it is feasible to identify, via computer processing of numerical optimization, combinations of stack component indices (within the realm of physically-realizable values) and thicknesses (also constrained by limitations of fabrication capabilities and considerations of device performance other than efficiency) which maximize the total efficiency of emission into the encapsulant. This constitutes what is referred to as "blind" numerical optimization.

Another advantage of the computerized model is realized by mining the model for physical understanding of particular device constructions. That is, the computerized model can be used to develop simple design rules, corroborated by physical understanding derived from special-case simplifications of the model equations, which intelligently guide otherwise blind optimizations to achieve reliably-known global optimum designs in a reasonable amount of computer processing time. For example, the computerized model identifies and physically rationalizes the necessity for a sufficiently-large light-emitting layer thickness to avoid inefficiency due to near-field absorption in neighboring layers. By constraining computer processing of numerical optimizations to light-emitting layer thicknesses which equal or exceed the minimum value, certain embodiments can significantly reduce the extent of design space, and therefore the computer processing time, which must be probed by numerical evaluations.

The computerized model can also serve to identify the design factors which most critically affect device efficiency. For example, it is now known and corroborated by physical understanding that the imaginary components of the indices of refraction of the emission-stack component materials critically affect device efficiency. This knowledge provides the impetus for precise and accurate experimental characterizations of the absorptivities of candidate materials. In this fashion, the computerized model can be instrumental to the development of an experimental architecture for a research and development program or for other purposes.

Once a product design is selected and its expected performance is verified by experimental characterization of prototypes, for example, the computerized model can be exercised to evaluate the sensitivity of performance to variations in composition (e.g., layer thicknesses and material indices) which result from any less-than-perfect manufacturing process. The predicted sensitivities can be used to establish process-control requirements, for example, and in circumstances where sufficient control is not possible, alternate designs can be sought which possess diminished sensitivities. In this fashion, the computerized model can be instrumental to the development of a robust product design and a well-controlled, high-yield manufacturing process.

Accordingly, the computerized model can provide a technical roadmap for the design, fabrication, characterization, and eventual manufacturing of high-efficiency OLEDs without the need for building and evaluating each and every design as a physical prototype.

1 DEVICE ARCHITECTURES

1.1 Emission Stacks

An exemplary OLED comprises two parallel encapsulant layers impervious to oxygen and water, which sandwich two parallel electrode layers capable of conducting current within the plane of the device. The electrode layers in turn typically sandwich several parallel layers of organic materials capable of conducting current normal to the plane of the device, including at least one capable of generating molecular electric-dipole emission at a frequency within the visible light range under the influence of an impressed electric field.

In nearly all OLED architectures, either the electrode or the encapsulant on one side of the light-emitting layer possesses significant dielectric loss, and is sufficiently thick so as to be opaque at the emission frequency, resulting in one-sided emission. Opacity is preferably attained via efficient reflection, as opposed to internal absorption. Both the electrode and the encapsulant on the other side of the light-emitting layer must be substantially transparent to allow for the transmission of visible light. The electrode generally will possess some dielectric loss, requiring it to be optically thin. The optical thickness of a layer refers to its thickness expressed as the number of electromagnetic wavelengths within the medium at the emission frequency. The terms small, moderate, or large mean values much less than, comparable to, or much greater than one. The transparent encapsulant is invariably optically thick, requiring it to possess negligible dielectric loss.

The conductivity of the organic materials is invariably low, and the cumulative thickness of these layers must be small to avoid the requirement for high impressed voltages. Accordingly, the cumulative optical thickness of the organic layers in an OLED is typically small to moderate.

The construction features of this exemplary architecture that are relevant to the electromagnetic functioning of a device are 1) a series of optically-thin parallel layers, at least one of which is light emitting, of small-to-moderate total optical thickness, sandwiched between 2) an optically-thick transparent encapsulant possessing negligible dielectric loss, and 3) an optically-thick opaque (and preferably reflective) electrode or encapsulant.

FIG. 1 depicts an example of a small-molecule bottom-emitting OLED emission stack 10, shown here with the structure inverted so that emission occurs toward the top of FIG. 1. In this emission-stack architecture 10, the opaque (and reasonably highly-reflective) layer is the Al cathode 22. The ITO (Indium tin oxide) anode 14 is substantially transparent, but only by virtue of being optically thin, as ITO possesses significant dielectric loss in the visible. The transparent encapsulant 12 is on the order of millimeter-thick glass, extremely optically thick, but also possessing negligible loss within the visible light range (loss tangents generally $10^{-6}$ or less). The electromagnetically-relevant components of the emission stack are distinguished by the following. The glass 12 is the transparent encapsulant, the Al cathode 22 constitutes the opaque electrode or encapsulant, and the ITO 14, MTDATA 16, npd 18, and Alq 20 constitute the series of optically-thin parallel layers of small-to-moderate total optical thickness.

1.2 Optical Paths

Typically, the transparent encapsulant of an OLED device is homogeneous and of uniform thickness. However, the emission characteristics of a device can be altered significantly, often in a desirable manner, by including heterogeneities, either random or deterministic, within the bulk of the encapsulant, or adding structure, either random or deterministic, to the exterior surface of the encapsulant. Similarly, the emission can be altered by adhering nominally-planar films, themselves possessing bulk heterogeneities or surface structure, to the exterior surface of the encapsulant, either in optical contact or separated by an air gap. One can also envision, among these parasitic films, films containing numerous layers of distinct dielectric response engineered for specific optical effects, such as multilayer optical film. Stacks of nominally-planar films can also be created, with effects that will depend upon the identity and ordering of components and their assembly with or without air gaps. The number of configurations imaginable is astronomical.

Figure 2:
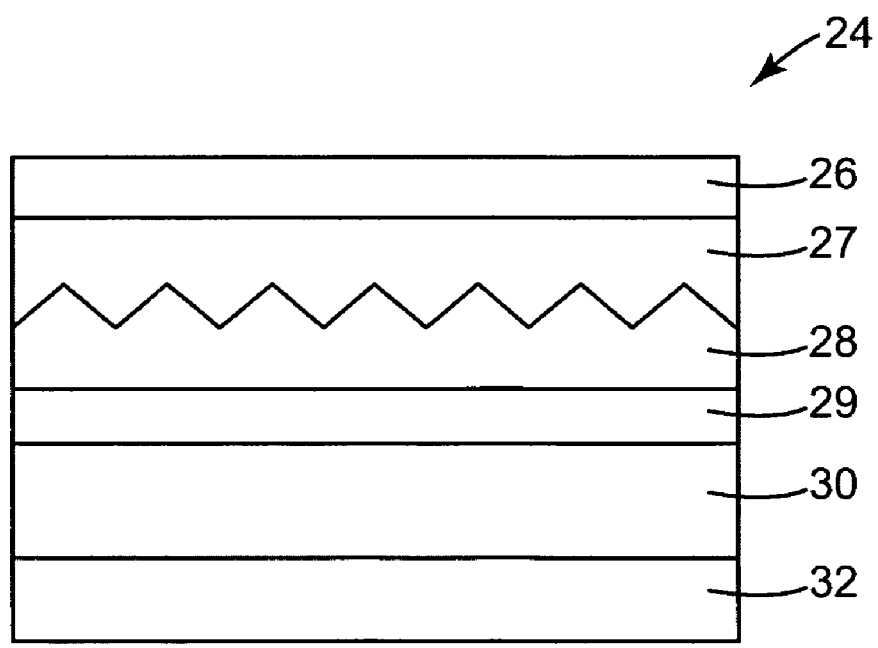
FIG. 2 is a diagram of an example application of three parasitic films for use in computerized OLED modeling.

FIG. 2 depicts an exemplary device construction 24 where a bulk-diffusing film of host index n=1.50 (layer 30, an example of a film possessing random bulk heterogeneities) has been applied to the homogeneous and uniformly-thick index n=1.53 (layer 32) glass encapsulant of a standard OLED device. Use of the letter "n" refers to the index of refraction. The diffusing film is maintained in optical contact with the encapsulant by, for example, an index n=1.50 adhesive between the film and the encapsulant, not shown in FIG. 2. A sheet of monolithic polycarbonate n=1.58 BEF (layer 28) is applied "points up" on top of the diffuser. The term BEF refers to brightness enhancement film, an example of a film possessing deterministic surface structure. Layer 28 is applied without adhesive and is thus separated from the diffuser at most locations by an index n=1.00 air gap 29. A sheet of MOF 26, an example of a film composed of other than surface structure and bulk heterogeneities, is applied on top of the BEF 28, again without an adhesive and thus also separated from the BEF 28 by an index n=1.00 air gap 27. The "external world" is the index n=1.00 space above the MOF 26. The radiance within this space is the device emission, which certain embodiments seek to affect in a desirable manner by the incorporation of these three parasitic films or layers.

The term encapsulant-to-air "optical path" means an ordered list of 1) each interface, planar or structured, separating media of distinct index of refraction, 2) each plane-parallel layer of bulk heterogeneities within a host of otherwise uniform index, but possibly complex, index of refraction, and 3) any additional structures or heterogeneities not representable as a combination of 1 and 2 which are encountered between the encapsulant-electrode interface and the air exterior to the device. The optical path of the exemplary construction depicted in FIG. 2 comprises 1) a plane interface between index n=1.53 (layer 32) and n=1.50 media (layer 30), 2) a plane-parallel layer of random heterogeneities embedded within a medium of host index n=11.50 (layer 30), 3) a plane interface between index n=1.50 and n=1.00 media, 4) a plane interface between index n=1.00 and n=1.58 media, 5) a deterministic sawtooth interface between index n=1.58 and n=1.00 media, and 6) a sheet of MOF 26 immersed, both above and below, within an index n=1.00 medium.

1.3 Relative Scales

A primary focus, in certain embodiments, is restricted to OLED devices whose horizontal dimensions within the plane of the device are large relative to the total thickness of the transparent encapsulant and any parasitic films, and whose emission-stack and normal current density are uniform over the extent of the device. These embodiments are further restricted to bulk inhomogeneities and/or surface structures which, if deterministic, are doubly periodic within the horizontal plane, and, if random, are horizontally stationary. The doubly-periodic structure may possess infinitesimal periods in either or both horizontal dimensions, pertaining to the circumstances of translationally-invariant or plane-parallel structures, respectively. Horizontal stationarity means that the statistics of, for example, variations in index of refraction or surface displacement are independent of position within the horizontal plane.

Furthermore, these embodiments assume that the unit cell of periodic structures, and the horizontal footprint which envelopes an ensemble of random structures, are so small that no observation of the radiance emitted by the device can resolve position dependence on these scales. In these circumstances, the radiance emitted by the device will depend upon direction but will be independent of position, except within a few encapsulant-plus-film thicknesses of the edges. The non-uniform border will, by assumption, represent but a small fraction of the total area of the device.

Most OLED devices envisioned for lighting applications, for example, conform well to these size and uniformity constraints. As viewed in most lighting scenarios, position dependence of emission from such devices will not be discernible on scales much smaller than a millimeter. Many deterministic microstructured films possess periods much smaller than a millimeter, for example, BEF. Most bulk diffusers, typically containing 1-10 μm scattering particles, contain many particles within a one-millimeter footprint. And most surface diffusers contain many independent facets. Of more fundamental importance, the technologies needed to create new deterministic or random microstructured films or bulk diffusers with scales much smaller than a millimeter are well established. Thus, using a computerized model, the potential exists for designing and fabricating structures which in some sense optimize emission for lighting devices.

The motivation for restricting a focus to circumstances that engender a position-independent radiance, thus restricting a consideration to, for example, devices for lighting, is the availability of an analytic means to solve the Radiative-Transfer Equation (including all the complexities of diffusers, microstructures, and stacks) when the radiance depends only upon direction. As described below, an exemplary computerized device model comprises of two major components. The first major component is the electromagnetic component, which predicts the emission from the organic layers into the transparent encapsulant. The second major component is the radiative-transfer component, which predicts the emission through the encapsulant and attached films into air. Solutions which are essentially analytic are always possible for the electromagnetic component. In the circumstance of devices for lighting, analytic solutions are also possible for the radiative-transfer component, making the entire device model analytic, and therefore fast, accurate, and reliable.

It is not intended, however, to limit embodiments to only this circumstance where complete analytic solution is possible. For example, a display application is envisioned where the horizontal extent of each OLED device in the display (i.e., each pixel) is comparable to the thickness of the transparent encapsulant, and where a common, continuous encapsulant is shared by all of the pixels in the display. Also envisioned is a small-scale deterministic microstructure on the exterior surface of the encapsulant, whose period is much less than the horizontal extent of a pixel, and therefore also much less than the spatial resolution of any observation of the emitted radiance. For this device, the emission from the organic layers into the encapsulant can be evaluated analytically in exactly the same manner as for any other device. And the interaction of radiance with the microstructured exterior surface of the encapsulant can also be evaluated analytically, using methods similar to those by which the emission into air by a large device is evaluated. The sole modification results from the need to evaluate the directional dependence of the emitted radiance, and the positional dependence resulting from the limited horizontal extent of the device. While not analytic, solutions can nevertheless be determined via, for example, ray-trace simulation. Since the interaction of radiance with the microstructures has been predetermined, the computerized simulation can be confined to the space between two parallel planes representing the encapsulant-electrode interface, and the mean of the exterior microstructured surface of the encapsulant. This stark simplicity enhances computational efficiency, making the computerized device model reasonably fast, accurate, and reliable.

2 MODEL INPUTS

The following are the inputs for a computerized model, according to certain embodiments, for evaluating OLED device constructions.

The frequency of emission, usually expressed in terms of the corresponding free-space wavelength $\lambda_0$.

The emission-stack structure, as specified by:

(a) The composition of the opaque electrode or encapsulant, specifically, its complex index of refraction at the emission frequency. This layer is assumed to posses finite dielectric loss, and to be sufficiently thick so as to be opaque.

(b) The composition of the transparent encapsulant, specifically its complex index at the emission frequency. The transparent encapsulant is always assumed free of dielectric loss and to be much thicker than the electromagnetic wavelength within the encapsulant medium.

(c) The composition of each layer between the opaque electrode or encapsulant and the transparent encapsulant, specifically its complex index at the emission frequency. Also included is the ordering of these layers and the thickness of each.

(d) The distance between the surface of the opaque electrode or encapsulant and the layer of oscillating molecular electric dipoles within the light-emitting layer ($z_s$).

(e) The average orientation of the molecular dipoles, expressed in terms of the average value of $$\frac{3}{2}\sin^2\beta,$$

where $\beta$ is the polar angle between a dipole and the direction normal to the plane of the device. For example, $$\left\langle \frac{3}{2}\sin^2\beta \right\rangle = 0$$

for vertical dipoles $$\left\langle \frac{3}{2}\sin^2\beta \right\rangle = \frac{3}{2}$$

for horizontal dipoles, and $$\left\langle \frac{3}{2}\sin^2\beta \right\rangle = 1$$

for isotropically-oriented dipoles. The azimuthal orientation is always assumed uniform and random over $2\pi$ radians.

Figure 3:
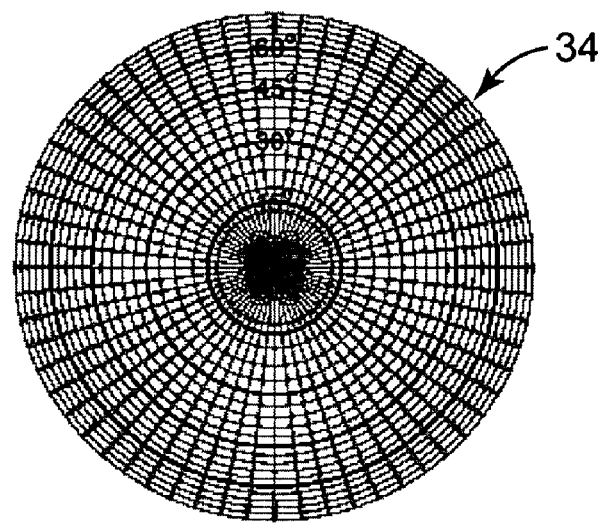
FIG. 3 is a diagram illustrating equal-area partitioning of a unit circle for a particular example for use in computerized OLED modeling.

A partitioning of the unit circle into an N'-by-N" polar array of N=N'N" equal-area cells, each spanning 360/N" degrees of azimuth and an increment of squared radius equal to 1/N'. The specific inputs required are the values of N' and N". This partitioning for N'=20 and N"=60 is depicted in FIG. 3 as unit circle 34.

The N-by-N matrix representations of the bidirectional reflectivity distribution function (BRDF) and bidirectional transmissivity distribution function (BTDF) of each component of the optical path, both for incidence from below and incidence from above, in the directional basis specified by the selected partitioning of the unit circle when position within the circle signifies the horizontal projection of a direction on the unit hemisphere. These BRDFs and BTDFs are denoted as $\underline{\underline{R}}^{(b)}$ (the superscript 'b' indicating incidence from below), $\underline{\underline{R}}^{(a)}$, $\underline{\underline{T}}^{(b)}$, and $\underline{\underline{T}}^{(a)}$. Each is an N-by-N matrix (indicated by the double underline) of non-negative real values. The element occurring in the kth row and the lth column of $\underline{\underline{R}}^{(b)}$ (denoted as $R_{kl}^{(b)}$) is the power per unit horizontal area reflected by the subject component into directions spanned by cell k, when that component is illuminated from below by a spatially-uniform radiance confined to directions within cell l which results in unit power per unit horizontal area illumination. The element occurring in the kth row and lth column of $\underline{\underline{T}}^{(b)}$ (denoted as $T_{kl}^{(b)}$) is the power per unit horizontal area transmitted into directions spanned by cell k for the same illumination. The elements of $\underline{\underline{R}}^{(a)}$ and $\underline{\underline{T}}^{(a)}$ are defined analogously, but for incidence from above the subject component, with reflection into upwards directions and transmission into downwards directions. Electromagnetic reciprocity demands the following symmetries in $\underline{\underline{R}}^{(b)}$, $\underline{\underline{R}}^{(a)}$, $\underline{\underline{T}}^{(b)}$, and $\underline{\underline{T}}^{(a)}$;

$$\underline{\underline{R}}^{(a)} = \underline{\underline{R}}^{(a)t}$$

$$\underline{\underline{R}}^{(b)} = \underline{\underline{R}}^{(b)t}$$

$$\frac{n_a}{n_b}\underline{\underline{T}}^{(a)} = \frac{n_b}{n_a}\underline{\underline{T}}^{(b)t}$$

where $\underline{\underline{A}}^t$ denotes the transpose of the real matrix $\underline{\underline{A}}$ (the result of inter-changing the k, l, and l, k elements for every combination of k and l such that k<l), and $n_a$ is the index of refraction above the subject component of the optical path, and $n_b$ the index below this component. Thus, the specification of $\underline{\underline{R}}^{(b)}$ and $\underline{\underline{R}}^{(a)}$ requires only the specification of the N(N+1)/2 unique elements on and either above or below the diagonal for each, and the specification of $\underline{\underline{T}}^{(b)}$ and $\underline{\underline{T}}^{(a)}$ requires only specification of all $N^2$ elements of one or the other, as well as the ratio of the indices above and below the subject component.

3 COMPUTER-IMPLEMENTED METHODS

3.1 Overview

The physics of electromagnetism engenders a natural separation of a model of OLED emission into two components. The first concerns the interaction of fields generated by the molecular dipoles with the index structure of the order-wavelength leaky waveguide within which these dipoles reside. The accurate characterization of these local fields requires full-wave solution of Maxwell's equations. The second concerns the radiation created by the local fields within the relatively-thick, transparent encapsulant, and its interaction with the bulk and interfacial scattering properties of this medium and any attached films. This is characterized by solution of the Radiative-Transfer equation. The prescribed equations in each regime encompass virtually all know electromagnetic effects, so that their exact solution yields an essentially-exact description of OLED emission. The primary challenge of OLED model development is to derive accurate solutions of these equations. The present computerized model accomplishes exact, or essentially-exact, solutions for both components.

A secondary challenge of model development is to devise simple solutions to the relevant equations in each regime. The importance of simplicity relates primarily to the ease with which the effects of device design can be discerned. The more simple the solution, the more transparent the effects, and the more easily optimum designs are identified. Equivalently, the more simple the solution, the more computationally-efficient its evaluation, and the larger the domain of design space that can be explored in any analysis of finite duration. The present computerized model accomplishes analytic solutions in closed form for most performance attributes. Where numerical evaluation is required, it is applied only after every conceivable analytic simplification has been implemented.

3.2 Optical Path

Certain embodiments do not include the means for evaluating the required input matrix representations of the BRDFs and BTDFs of each component of the optical path. Methods for doing so are discussed in greater detail in commonly assigned and co-filed U.S. Patent Application entitled "Method and Apparatus for Simulation of Optical Systems" (Ser. No. 60/741,020). Such methods include analytic formulas for particularly-simple components, and a general method, based upon ray-trace simulation, for complex components. The components for which analytic methods are discussed in that co-filed application include the following:

1. plane interfaces between media of distinct refractive index,
2. nominally-planar Lambertian reflecting and transmitting surfaces,
3. plane-parallel layers of random bulk heterogeneities within a host of otherwise uniform index, and
4. any plane-parallel structure possessing a known specular reflectivity and transmissivity as a function of incidence angle between upper and lower media of equal refractive index.

The matrix representations for components not representable as components 1, 2, 3, or 4 identified above can be evaluated by ray-trace simulation. To evaluate the lth columns of $\underline{\underline{R}}^{(b)}$ and $\underline{\underline{T}}^{(b)}$, an ensemble of rays is launched from below, representing a uniform radiance confined to upwards directions within cell l. The reflected power per unit horizontal area is accumulated in an N-dimensional array according to the cell in which the horizontal projection of each reflected ray resides. Similarly, the transmitted power per unit horizontal area is accumulated in a separate array of transmitted directions. The lth columns of $\underline{\underline{R}}^{(b)}$ and $\underline{\underline{T}}^{(b)}$ are then equal to the accumulated reflected and transmitted powers per unit horizontal area, divided by the incident power per unit horizontal area. To evaluate the lth columns of $\underline{\underline{R}}^{(a)}$ and $\underline{\underline{T}}^{(a)}$, an ensemble of rays is launched from above in downwards directions. Alternatively, the structure of the subject component can be inverted, and a second simulation initiated which is procedurally identical to the first. The resulting matrices will be exact only in the limit as the number of rays approaches infinity. For any finite number of rays, the integrity of the results is enhanced, and at the same time reciprocal symmetries are strictly enforced, by replacing $\underline{\underline{R}}^{(a)}$, $\underline{\underline{R}}^{(b)}$, $$\frac{n_a}{n_b}\underline{\underline{T}}^{(a)},$$

and $$\frac{n_b}{n_b}\underline{\underline{T}}^{(b)t}$$

by the values $$\underline{\underline{R}}^{(a)} = \frac{1}{2}\left(\underline{\underline{R}}^{(a)} + \underline{\underline{R}}^{(a)t}\right)$$

$$\underline{\underline{R}}^{(b)} = \frac{1}{2}\left(\underline{\underline{R}}^{(b)} + \underline{\underline{R}}^{(b)t}\right)$$

$$\frac{n_a}{n_b}\underline{\underline{T}}^{(a)} = \frac{n_b}{n_a}\underline{\underline{T}}^{(b)t} = \frac{1}{2}\left(\frac{n_a}{n_b}\underline{\underline{T}}^{(a)} + \frac{n_b}{n_a}\underline{\underline{T}}^{(b)t}\right)$$

where the matrices on the right-hand sides are the original matrices from the simulations.

In the exemplary optical path in device construction 24 shown in FIG. 2, analytic means exist for evaluating the matrix representations of the BRDFs and BTDFs of components 1, 2, 3, 4, and 6 as described above in the Overview Section. Only the sawtooth interface requires ray-trace simulation.

Certain embodiments include the means for combining the BRDFs and BTDFs for each component of the optical path to determine the BRDFs and BTDFs of the optical path as a whole. The present computerized method combines the BRDFs and BTDFs of two adjacent layers to determine the BRDFs and BTDFs of the composite structure, and the computerized method iterates by replacing the BRDFs and BTDFs of the first layer by the result of the previous combination, and those of the second layer by those of the next component of the optical path, until all components of the path have been exhausted. Each pairwise combination is accomplished according to $$\underline{\underline{R}}^{(a)} = \left(\frac{n_a}{n_2}\underline{\underline{T}}_2^{(a)}\right)^t (\underline{\underline{1}} - \underline{\underline{R}}_1^{(a)}\underline{\underline{R}}_2^{(b)})^{-1} \underline{\underline{R}}_1^{(a)}\left(\frac{n_a}{n_2}\underline{\underline{T}}_2^{(a)}\right) + \underline{\underline{R}}_2^{(a)}$$

$$\underline{\underline{R}}^{(b)} = \left(\frac{n_2}{n_b}\underline{\underline{T}}_1^{(a)}\right)(\underline{\underline{1}} - \underline{\underline{R}}_2^{(b)}\underline{\underline{R}}_1^{(a)})^{-1} \underline{\underline{R}}_2^{(b)}\left(\frac{n_2}{n_b}\underline{\underline{T}}_1^{(a)}\right)^t + \underline{\underline{R}}_1^{(b)}$$

$$\frac{n_a}{n_b}\underline{\underline{T}}^{(a)} = \left(\frac{n_2}{n_b}\underline{\underline{T}}_1^{(a)}\right)(\underline{\underline{1}} - \underline{\underline{R}}_2^{(b)}\underline{\underline{R}}_1^{(a)})^{-1}\left(\frac{n_a}{n_2}\underline{\underline{T}}_2^{(a)}\right)$$

where the computerized method deals explicitly with only the scaled transmissivity for incidence from above $$\left(\frac{n_a}{n_b}\underline{\underline{T}}^{(a)}\right),$$

and evaluates that for incidence from below $$\left(\frac{n_d}{n_a}\underline{\underline{T}}^{(b)}\right)$$

by transposition. The subscripts 1 and 2 on the right-hand sides denote the scaled matrices for the lower and upper components, respectively; the unsubscripted scaled matrices on the left are those for the combination. Evaluating the BRDFs and BTDFs of an M-component optical path in this manner requires M−1 successive applications of these relations.

The matrices representing the BRDFs and BTDFs are often large (1200-by-1200 when, for example, N′=20 and N′=60), so that the repeated pairwise combination of these can be time consuming. However, many common optical-path components possess a substantial degree of symmetry, which can be exploited to factor the matrix BRDFs and BTDFs into block-diagonal form, resulting in substantial computational accelerations. An extreme example is azimuthally and mirror symmetric components, for which the BRDFs and BTDFs depend upon only the radial positions of the incident and reflected or transmitted directions in the unit circle, and the absolute value of the difference in their azimuthal angles. Examples include components 1-4 identified above. For any azimuthally and mirror symmetric components, $\underline{\underline{R}}^{(a)}$, $\underline{\underline{R}}^{(b)}$, and $$\frac{n_a}{n_b}\underline{\underline{T}}^{(a)}$$

can be factored into N″ N′-by-N′ blocks, (N″+2)/2 of which are unique. The computational acceleration when, for example, N′=20 and N″=60, is a factor of 7,000 for each pair of azimuthally and mirror symmetric combinations.

It is clear that the operational definition of the optical path is simply a series of consecutive components whose individual BRDFs and BTDFs are known. The BRDFs and BTDFs of common combinations of primitive components, such as a plane interface between n=1.00 air and n=1.58 polycarbonate underlying a sawtooth interface between polycarbonate and air (representing points-up BEF in air), can be cataloged and referenced by the model, so that, for example, the optical path depicted in device construction 24 shown in FIG. 2 can be characterized by combining 5 (as opposed to 6) components.

3.3 Encapsulant-to-Air Transmission

Certain embodiments also include the means for evaluating the radiance emitted by an OLED device, given the BRDFs and BTDFs of the optical path, and both the radiance emitted by the stack into the encapsulant and the reflectivity of the stack for incidence from within the encapsulant as derived from the emission-stack component of the model (described below). This is accomplished according to $$\underline{I}_t = \underline{\underline{T}}^{(b)}(\underline{\underline{1}} - \underline{\underline{R}}^{(a)}\underline{\underline{R}}^{(b)})^{-1}\underline{I}^0$$

where $\underline{I}_t$ is an N-component column vector of non-negative real values which specifies the angular distribution of the position-independent radiance emitted into air by the device. Each component represents the average emitted radiance within a different cell of the N′-by-N″ polar partitioning of the unit circle (described previously as the means of specifying direction on the unit hemisphere). Parameters $\underline{\underline{R}}^{(b)}$ and $\underline{\underline{T}}^{(b)}$ are the matrix representations of the BRDF and BTDF of the optical path for incidence from below. Parameter $\underline{\underline{T}}^{(b)}$ is derived from the scaled transmissivity $$\frac{n_b}{n_a}\underline{\underline{T}}^{(b)}$$

by multiplying by $n_a/n_b$. Since the net transition in index through the optical path is always from $n_b = n_e$ (the index of the transparent encapsulant) to $n_a = 1.00$ (the index of air), $$\frac{n_a}{n_b} = \frac{1}{n_e}.$$

Parameter $\underline{I}_0$ is an N-component column vector of non-negative real values which specifies the angular distribution of the position-independent radiance emitted into the encapsulant by the stack. Again, each component represents the average value within a different cell of the partitioning of the unit circle. In terms of the continuum representation $I_0(\sin\theta)$, equal to the radiance emitted by the stack into polar angle $\theta$ relative to upwards normal, the lth component of $\underline{I}_0$ is $$I_{0\ell} = \frac{1}{|\Delta s_h(\ell)|}\int_{\Delta s_h(\ell)} ds_h I_0(|s_h|)$$

where $s_h$ denotes position within the unit circle, $\Delta s_h(l)$ the domain of the lth cell, and $|\Delta s_h(l)|$ ($=\pi/N$) the area of the lth cell. Finally, $\underline{\underline{R}}^{(a)}$ is a N-by-N diagonal matrix of non-negative real values whose lth diagonal element is equal to the polarization-averaged specular reflectivity $R^{(a)}(\sin\theta)$ of the emission stack for plane-wave incidence from within the encapsulant at polar angle $\theta$, averaged over $\Delta s_h(l)$;

$$R_{\ell\ell'}^{(a)} = \frac{1}{|\Delta s_h(\ell)|} \int_{\Delta s_h(\ell)} ds_h R^{(a)}(|s_h|)$$

In terms of $I_r$, the total power per unit horizontal area emitted by the device into air is $$\sum_{\ell=1}^{N} I_{r\ell}|\Delta s_h(\ell)| = \frac{\pi}{N} \sum_{\ell=1}^{N} I_{r\ell}$$

3.4 Stack Emission

Certain embodiments also include the means for evaluating the radiance emitted by the stack into the encapsulant, and the power consumed to maintain constant-amplitude oscillations of the molecular dipoles which ultimately create the emission. The ratio of these defines the normalized radiance into the encapsulant. When integrated over the unit circle of horizontal projections of directions on the unit hemisphere, this normalized radiance yields the total efficiency of emission into the encapsulant, defined as the power per unit horizontal area radiated into the encapsulant relative to that consumed by the dipoles. When the radiance exterior to the device is evaluated using the normalized radiance into the encapsulant as input, the result is the normalized device radiance. This, when integrated over the unit circle, yields the total efficiency of device emission, defined as the externally radiated power relative to that consumed by the dipoles. Angular dependence is unaffected by normalization, so that both the normalized radiance into the encapsulant and the normalized device radiance faithfully reproduce the angular distributions of the corresponding actual radiances.

The efficiency we determine is the electromagnetic efficiency, whose deficit from one reflects only the absorption of electromagnetic energy in lossy materials within the device. In the complete absence of material absorption, the electromagnetic efficiency generally remains less than one because surface-guided power is not counted as radiation. With any conceivable finite material absorption, virtually all surface-guided power is consumed for any device of even the smallest conceivable horizontal extent, and therefore does not contribute to radiation. The electromagnetic efficiency does not include, for example, direct current (DC) resistive loss, inefficiencies in the radiative recombination of electrons and holes, or (for the case of white-light emitters) inefficiency in the visible emission due to a poor spectral match with the human visual response. These factors contribute additional deficits in, for example, the luminous efficiency of a white-light emitter relative to the theoretical limit of 680 lumens/Watt.

3.4.1 Emitted Radiance

Computerized models in certain embodiments evaluate the radiance emitted by the stack into the encapsulant by initially considering a single molecular dipole, and solving Maxwell's equations for the square-magnitude of the electric field in the far field of the dipole within the encapsulant. An established method of electromagnetic theory which is not commonly applied to OLED emission is adopted as follows:

1. Adopt established means for expressing the electric and magnetic fields in terms of a vector Hertz potential $\Pi$ (a bold-face character denotes a vector).

2. Reexpress $\Pi$ in terms of its horizontal Fourier transform $\hat{\Pi}$ (a "hat" denotes the Fourier transform).

3. Resolve $\hat{\Pi}$ into components parallel to the Fourier vector k (the a component), perpendicular to k (the b component), and normal to the horizontal plane (the z component).

4. Express each of $\hat{\Pi}_{a,b,z}$, when these represent a solution to Maxwell's equations, as an arbitrary linear combination of positive and negative exponentials in z.

5. Specify the coefficients in the linear combination within each layer of the emission stack by the imposition of boundary conditions upon the electric and magnetic fields at each interface between layers, at the emission layer, and at infinity.

6. Express the a and b components of the horizontal Fourier transform of the electric field at the encapsulant-electrode interface in terms of the solutions $\hat{\Pi}_{a,b,z}$ ($\hat{E}_z$ is not required).

7. Invoke the stationary-phase approximation to invert the Fourier transform, resulting in closed-form expressions for the longitudinal and latitudinal transverse components of the electric field ($E_r$ and $E_l$ respectively) at infinity within the encapsulant in an arbitrary direction on the unit hemisphere (the radial component of the electric field vanishes).

8. Form the square magnitudes of $E_r$ and $E_l$.

The Hertz potential provides a convenient formalism for evaluating electric and magnetic fields generated by dipole sources. Consideration of horizontal Fourier transforms reduces the three-dimensional differential equations of electromagnetism to one-dimensional (ordinary) differential equations in z possessing simple analytic solutions. The resolution of vectors into a, b, and z components uncouples vector components in the expression of boundary conditions. And the stationary-phase approximation, which is exact in the far-field limit, permits analytic inversion of the Fourier transform.

To determine the polarization-dependent components of the radiance, a computerized model assumes an ensemble of dipoles of areal density $\sigma$ in the horizontal plane, possessing statistically-independent phases and random orientations distributed according to the prescribed input value of $$\left\langle \frac{3}{2}\sin^2\beta \right\rangle,$$

and sums the square magnitude of the electric field generated by each. The result is $$I_r = \frac{1}{2}|P|^2 \frac{\omega^4 \mu_0 \sqrt{\varepsilon_0\mu_0}}{12\pi} \frac{n_e^7 \cos^2\theta}{\pi} \left( \left\langle \frac{3}{2}\sin^2\beta \right\rangle \left|\varepsilon_0 \underline{k}_0 \hat{\Pi}_b\right|^2 \right) \frac{\sigma}{\cos\theta}$$

$$I_\ell = \frac{1}{2}|P|^2 \frac{\omega^4 \mu_0 \sqrt{\varepsilon_0\mu_0}}{12\pi} \frac{n_e^7 \cos^2\theta}{\pi}$$

$$\left( \cos^2\theta \left\langle \frac{3}{2}\sin^2\beta \right\rangle \left|\varepsilon_0 \underline{k}_0 \hat{\Pi}_b\right|^2 + \sin^2\theta \langle 3\cos^2\beta \rangle \left|\varepsilon_0 \underline{k}_0 \hat{\Pi}_z\right|^2 \right)$$

where $|P|$ is the moment of each dipole, $\omega$ ($=2\pi c/\lambda_0$) is the angular frequency of emission and $\underline{k}_0$ ($=2\pi/\lambda_0$) the corresponding free-space wavenumber, $\varepsilon_0$ and $\mu_0$ are the permittivity and permeability of free space, and $\theta$ is the polar angle of emission relative to upwards normal. $\hat{\Pi}_{a,b,z}$ on the right-hand sides pertain to unit dipole moment and are evaluated immediately above the encapsulant-electrode interface (within the encapsulant), and at $k=n_e\underline{k}_0 \sin\theta\hat{\rho}$ (where $\sin\theta\hat{\rho}$ is the projection of the direction of emission on the unit hemisphere into the horizontal plane). The value of $\langle 3\cos^2\beta\rangle$ is related to the value of $$\left\langle\frac{3}{2}\sin^2\beta\right\rangle$$

specified as input according to $$\frac{2}{3}\left\langle\frac{3}{2}\sin^2\beta\right\rangle_\beta + \frac{1}{3}\langle 3\cos^2\beta\rangle_\beta = 1$$

which is true regardless of the nature of the distribution of dipole orientations.

The first two of the four Stokes parameters, whose values describe the intensity and state of polarization of light, are $I=I_r+I_l$ (the radiance) and $Q=I_r-I_l$. The remaining parameters U and V are equal to zero. In general, the emission into the encapsulant is elliptically polarized ($I_r \neq I_l$). However, the radiance emitted is evaluated by the model by considering polarization-averaged interactions of just the radiance emitted into the encapsulant with the various components of the optical path. In the circumstance of a homogeneous encapsulant of uniform thickness, the distinction between this device radiance, and that evaluated exactly by considering polarization-dependent interactions with all four Stokes parameters, is minor.

3.4.2 Power Consumption

The computerized model evaluates the power per unit horizontal area consumed by the same ensemble of oscillating dipoles by initially invoking Poynting's theorem in order to identify $$\text{Re}\left(-\frac{1}{2}\int dV E\cdot i\omega P^*\right)$$

as the power consumed by a single dipole whose volume density of dipole moment is P (the superscript * denotes the complex conjugate, and Re(f) denotes the real part of the complex quantity f). The computerized model invokes Parseval's theorem, the coordinate invariance of the dot product, the standard relations between $\hat{E}_{a,b,z}$ and $\hat{\Pi}_{a,b,z}$, and finally analytic integrations over z and the azimuthal component of the Fourier vector to obtain $$\int dV E\cdot P^* = |P|^2\sin^2\beta\frac{\pi}{(2\pi)^2}\int_0^\infty kdk\left(-\gamma_{le}^2\hat{\Pi}_a+k_{le}^2\hat{\Pi}_b\right)$$
$$= +|P|^2\cos^2\beta\frac{2\pi}{(2\pi)^2}\int_0^\infty kdk\left(k^2\hat{\Pi}_z\right)$$

where $\underline{k}_{le}^2=\omega^2 n_{le}^2\epsilon_0\mu_0, \gamma_{le}^2=k^2-\underline{k}_{le}^2$, and the subscript 'le' refers to values specific to the light-emitting layer. $\hat{\Pi}_{a,b,z}$ on the right-hand side pertain to unit dipole moment, and are evaluated at $z=z_s$.

To evaluate the integrals on the right-hand side, a computerized model first extracts terms equal to the sole contributions to $\hat{\Pi}_{a,b,z}$ in the circumstance of an infinite uniform space of index $n_{le}$ from each of $\hat{\Pi}_{a,b,z}$ to obtain quantities $\hat{H}_{a,b,z}$. A computerized model does so to remove divergent contributions to $\int dV P^*\cdot E$. The power consumption due to the uniform-space terms is evaluated in a manner which circumvents the evaluation of the integral. The result for a uniform space of purely real index is $n_{le}'$ is $$\text{Re}\left(-\frac{1}{2}\int dV E\cdot i\omega P^*\right) = |P|^2\frac{\omega^4\mu_0\sqrt{\epsilon_0}\,\mu_0}{12\pi}n_{le}'$$

a well-known result of electromagnetic theory. However, when $n_{le}$ possesses a finite imaginary component, representing material loss, the right-hand side is infinite. Such an infinity would engender an infinite power consumption by the ensemble of dipoles, and a resultant efficiency equal to zero. This cannot reflect reality, since OLED devices, whose light-emitting materials do possess finite loss, generate observable light emission.

The resolution of the apparent paradox resides in consideration of the scales on which solid materials composed of finite molecules behave as a continuum. If material loss is excluded from any finite sphere surrounding a point dipole, the uniform-space power consumption is finite. By choosing the radius of such a sphere equal to that required to envelop an ensemble of molecules whose average response represents the continuum, it is concluded that: the uniform-space contribution to the power consumption is well approximated by its value in a lossless medium as long as the loss tangent of the medium (the ratio of the imaginary and real components of the index) is less than approximately $10^{-3}$, loss tangents between $10^{-3}$ and $10^{-2}$ will result in significant degradations in efficiency relative to a lossless medium, approaching a factor of two or more at $10^{-2}$, and loss tangents substantially greater than $10^{-2}$ will engender near-singular absorption which renders efficient emission impossible.

Certain embodiments have identified and rationalized the previously unknown and unexpected requirement that loss tangents of OLED light-emitting materials be of order $10^{-2}$ or less, and preferably $10^{-3}$ or less, to allow for the possibility of efficient emission. This realization is subsumed into certain embodiments by its adoption as a requirement upon any light-emitting material analyzed by the computerized methods.

The power consumed by a single dipole embedded within the emission stack of the device (as opposed to a uniform space) is determined by adding the integral expressions for Re $$\text{Re}\left(-\frac{1}{2}\int dV E\cdot i\omega P^*\right)$$

involving $\hat{H}_{a,b,z}$ to the uniform space contribution for real $n_{le}$. The power per unit horizontal area consumed by an ensemble of dipoles of areal density σ, possessing statistically-independent phases and random orientations distributed according to the prescribed input value of $$\left\langle\frac{3}{2}\sin^2\beta\right\rangle,$$

is then $$|P|^2 \frac{\omega^4 \mu_0 \sqrt{\varepsilon_0} \mu_0}{12\pi} \left( n'_{te} + \left(\frac{3}{2}\sin^2\beta\right)(w'_a + w'_b) + \langle 3\cos^2\beta\rangle w'_z \right) \sigma$$

where $$w'_a = \text{Re}\left(-i \int_0^\infty x\, dx \left( (n_{te}^2 - x^2)\varepsilon_0 \underline{k}_0 \prod_a^{\tilde{z}} \bigg|_{k=\underline{k}_0 x} \right)\right)$$

$$w'_b = \text{Re}\left(-i \int_0^\infty x\, dx \left( n_{te}^2 \varepsilon_0 \underline{k}_0 \prod_b^{\tilde{z}} \bigg|_{k=\underline{k}_0 x} \right)\right)$$

$$w'_z = \text{Re}\left(-i \int_0^\infty x\, dx \left( x^2 \varepsilon_0 \underline{k}_0 \prod_z^{\tilde{z}} \bigg|_{k=\underline{k}_0 x} \right)\right)$$

All of the integrals on the right-hand side are now convergent.

The integrals cannot, in general, be reduced to closed form. Numerical integration is required. The integrands typically exhibit both rapid oscillations and near singularities along the path of integration (the positive real axis). Both features confound traditional numerical-integration schemes, due to the requirement for dense quadratures in the vicinity of near singularities, and loss of numerical precision associated with evaluation of the integral as the sum of many relatively large values of alternating sign. It is believed these difficulties have previously rendered the approach of evaluating power consumption via Poynting's theorem (and then efficiency by renormalization) useless. A critical component of certain embodiments is a novel scheme for accurately and efficiently completing the required numerical integrations.

The scheme is a numerical implementation of the method of steepest descents. The method of steepest descents is well established as an analytic means of discerning the asymptotic behavior of certain integrals. It is not commonly known as an accurate, efficient, and therefore powerful general technique for numerical integration of rapidly-oscillating and/or near-singular (or integrably-singular) integrands. The established basis is the deformation of the path of integration, maintaining fixed end points, within the complex plane, into a new path which avoids singularities and minimizes oscillations. This is accomplished with either no effect or a known effect upon the value of the integral according to whether the union of the original and deformed paths encloses any singularities in the integrand. The deformed path will comprise one or more contiguous segments, each associated with and passing through a stationary point (a point of zero complex derivative) of the logarithm of the integrand f, and along each of which Im(ln f) is constant. Each segment connects either two zeros of f, or a zero with the point at infinity. In the present circumstance, the relevant stationary points reside exclusively within the fourth quadrant of the complex plane, within a distance of the origin which is of the same order of magnitude as the largest index of refraction in the emission stack. And there exist no singularities whose presence alters the value of the integral upon deformation of the positive real axis into the steepest-descents path.

The present computerized model can uniquely recognize a possibility of a general computer-implemented algorithm which, given a region known to contain the relevant stationary points and an assurance of no enclosed singularities, completes the steepest-descents integration numerically. A computerized implementation of such an algorithm, according to certain embodiments, involves:

1. searching for stationary points within the specified region;
2. connecting each stationary point to either a zero of the integrand or the point at infinity along each of two steepest-descents contours emanating from and collinear at the stationary point; and
3. searching for a path involving these contours which connects the origin to the point at infinity.

Once a path is identified, the integral is evaluated according to $$\int_o^\infty dx f(x) \approx \sum_i e^{\ln f(z_i)} \sum_{k=0}^{N-1} w_k \left( \frac{dz^+}{dg}\bigg|_{ki} - \frac{dz^-}{dg}\bigg|_{ki} \right)$$

Here $z_i$ is the ith stationary point along the path. $w_k$ are a series of N weights associated with quadrature points $g_k$ selected such that $$\int_o^\infty dg\, h(g) e^{-g^2} \approx \sum_{k=0}^{N-1} w_k h(g_k)$$

for any slowly-varying h(g). $z^\pm(g_k)$ are the values of z along the steepest-descents contours emanating from $z_i$ such that $$\ln f(z_i) - \ln f(z^\pm(g_k)) = g_k^2$$

z+ is the value between $z_i$ and $z=+\infty$; z⁻ is the value between z=0 and $z_i$. Finally, $$\frac{dz^\pm}{dg}\bigg|_{ki}$$

is the derivative of $z^\pm(g)$ with respect to g evaluated at the point $z^\pm(g)$ on the contour emanating from $z_i$. Beyond the specification of a region and the assurance of no enclosed singularities, a user need only supply a routine capable of evaluating ln f, d ln f/dz, and $d^2$ ln f/$dz^2$ for arbitrary complex z.

Figure 4:
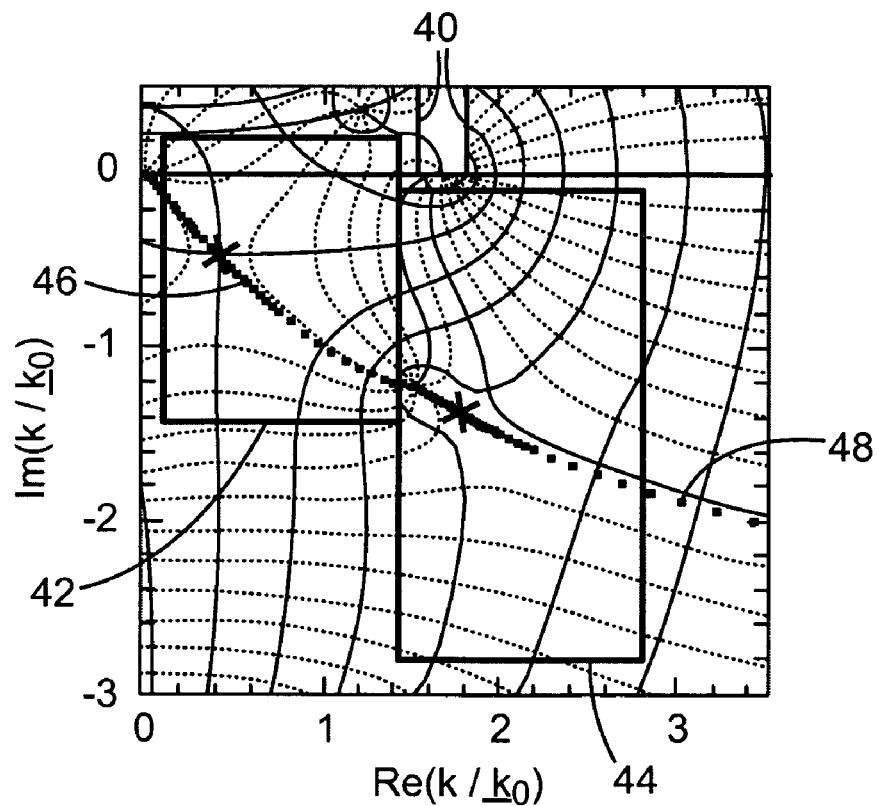
FIG. 4 is a diagram illustrating exemplary numerical steepest descents integration for use in computerized OLED modeling.

FIG. 4 illustrates the application of a computer-implemented algorithm, in certain embodiments, to the evaluation of the second integral above for a three-layer emission stack of indices $n_1$=0.125+i3.35, $n_2$=1.80, and $n_3$=1.53 when $\underline{k}_0 T_2$=2.86 and $\underline{k}_0 z_s$=2.00. The line segments 40 indicate the branch cuts $\sqrt{z^2-n_2^2}$ and $\sqrt{z^2-n_3^2}$ (factors appearing in $\hat{H}_b$). The solid and dashed curves depict contours of constant real and imaginary ln f respectively, for $$f(z) = z\left( n_2^2 \varepsilon_0 \underline{k}_0 \prod_b^{\tilde{z}} \bigg|_{k=\underline{k}_0 z} \right)$$

The features at the origin and at z≈1.5−i1.2 are singularities of ln f associated with zeros of f. The rectangles 42 and 44 represent Cartesian grids within which the procedure numerically searches for zeros of d ln f/dz. Two stationary points are identified in this manner, indicated by the X's. The dotted lines 46 and 48 depict the steepest-descent contours emanating from each. Note that these are coincident with contours of constant Im(ln f). The contours emanating from the left-hand stationary point connect the origin to the zero of f at $z \approx 1.5-i1.2$. Those from the right-hand stationary point connect $z \approx 1.5-i1.2$ to infinity. Together they complete the path from the origin to $z=+\infty$.

It is noted that dividing either the emitted radiance into the encapsulant or the emitted device radiance by the power consumption per unit horizontal area results in cancellation of the common factors $$|P|^2 \frac{\omega^4 \mu_0 \sqrt{\varepsilon_0 \mu_0}}{12\pi}$$

and $\sigma$. Thus, neither the normalized radiance into the encapsulant nor the normalized device radiance depends upon either the moment of the molecular dipoles or their areal density within the horizontal plane. Outputs expressed in terms of normalized radiances are independent of both of these factors, neither of which can be reliably predicted.

3.5 Stack Reflectivity

A computerized method of evaluating encapsulant-to-air transmission requires as input, in certain embodiments, the polarization-averaged specular reflectivity of the optically-thin layers of small-to-moderate total optical thickness "overlying" the optically-thick opaque electrode or encapsulant, for plane-wave incidence at polar angle $\theta$ from within the transparent encapsulant. This is the quantity $R^{(a)}(\sin \theta)$. The imposition of the boundary conditions which result in the specification of $\hat{\Pi}_{a,b,z}$ is accomplished in certain embodiments by a formalism which involves evaluating $|k|$-dependent complex interfacial reflection and transmission coefficients pertaining to each component of $\hat{\Pi}$ for each interface in the emission stack. In circumstances where there exists more than one interface separating the dipole layer from either the opaque electrode or encapsulant or the transparent encapsulant, simple interfacial coefficients are combined recursively to determine coefficients for the layered structures separating two media. The same approach and software can be utilized to evaluate effective coefficients for the interfaces separating the transparent encapsulant (e) and the opaque electrode or encapsulant (o). In terms of these, the complex reflection coefficients for parallel and perpendicular-polarized plane-wave incidence at polar angle $\theta$ are $$R_\| = R_{eo}^{(z)}(n_e \underline{k}_0 \sin \theta) \, R_\perp = R_{eo}^{(b)}(n_e \underline{k}_0 \sin \theta)$$

where the superscript indicates the component of $\hat{\Pi}$. In terms of $R_\|$ and $R_\perp$ $$R^{(a)}(\sin\theta) = \frac{1}{2}(|R_\||^2 + |R_\perp|^2)$$

4 OUTPUTS

The following outputs characterize the observable performance of the device based upon device constructions processed by a computerized model as described above.

1. The position-independent normalized device radiance, expressed as the average value within each cell of the N'-by-N" partitioning of the unit circle specified as input, when position within the unit circle represents the projection of a direction on the outward unit hemisphere into the plane of the device. The angular dependence of the normalized device radiance reproduces that of the actual radiance emitted by the device.

2. The integral of the normalized device radiance over the unit circle, equal to the total electromagnetic efficiency of device emission. The total electromagnetic efficiency of device emission is the power per unit device area radiated to infinity relative to that consumed to maintain constant-amplitude oscillations of the molecular dipoles that create the emission.

Several auxiliary outputs, as follows, are useful in understanding the origins of the observable device performance and can be generated using a computerized model as described above.

3. The position-independent normalized radiance emitted into the transparent encapsulant as a function of $\sin \theta$, where $\theta$ is the polar angle of emission relative to the normal to the plane of the device. The angular dependence of this normalized radiance reproduces that of the actual radiance emitted into the encapsulant.

4. The integral of the normalized radiance emitted into the encapsulant $$2\pi \int_0^1 \sin\theta \, d\sin\theta I(\sin\theta) \left( = 2\pi \int_0^{\pi/2} \sin\theta \, d\theta \cos\theta I(\theta) \right)$$

equal to the total electromagnetic efficiency of emission into the encapsulant.

5. The polarization-averaged bidirectional reflectivity and transmissivity distribution functions of the encapsulant-to-air optical path for incidence from within the encapsulant, expressed as N-by-N matrices in the directional basis specified by the selected partitioning of the unit circle.

6. The polarization-averaged specular reflectivity of the optically-thin layers of small-to-moderate total optical thickness overlying the optically-thick opaque electrode or encapsulant, for plane-wave incidence from within the transparent encapsulant, as a function of $\sin \theta$, where $\theta$, is the angle of incidence.

System Processing

Figure 5:
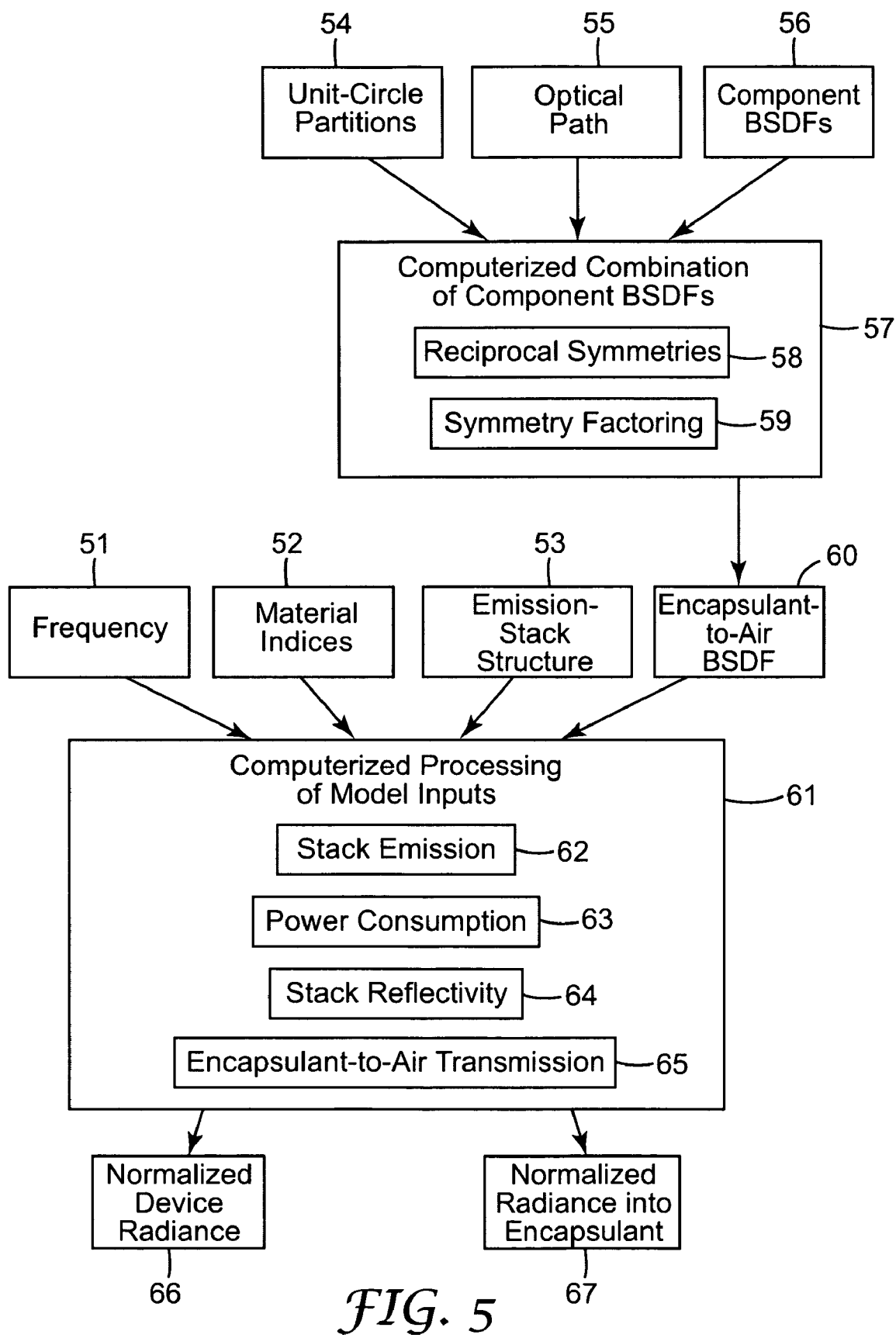
FIG. 5 is a diagram illustrating processing of exemplary inputs for a display construction, based upon model parameters, to generate outputs relating to the device performance.

FIG. 5 is a diagram illustrating a system for processing of exemplary inputs for a device construction to generate outputs relating to the device performance using the computerized model described above. The system receives values of several input parameters for a particular construction, including, for example, a frequency of emission 51, component material indices of refraction 52, an emission-stack structure 53, unit-circle partitions 54, a specification of the optical path 55, and BRDFs and BTDFs 56 (collectively referred to as BSDFs—bidirectional scattering distribution functions) for each component of the optical path. The modeling described above then occurs in two principal blocks of computerized processing 57 and 61. The first 57 effects the pairwise combination of BSDFs to determine the BSDF of the optical path as a whole, implementing the matrix method described above, and exploiting the convenience and acceleration afforded by reciprocal symmetries 58 and block factoring of matrices according to physical symmetries 59. This block provides the BRDF and BTDF of the encapsulant-to-air optical path for incidence from below 60 to the second block 61. The second block of processing implements the model components described above, including evaluation of the radiance emitted by the stack into the encapsulant 62, evaluation of the power consumed by the dipole source 63, evaluation of the reflectivity of the stack for incidence from within the encapsulant 64, and evaluation of the encapsulant-to-air transmission 65. Based upon the combined processing of both blocks, the system generates output providing an indication of the performance of the selected device construction, including, for example, the normalized device radiance 66 and the normalized radiance within the encapsulant 67, as described above.

Figure 6:
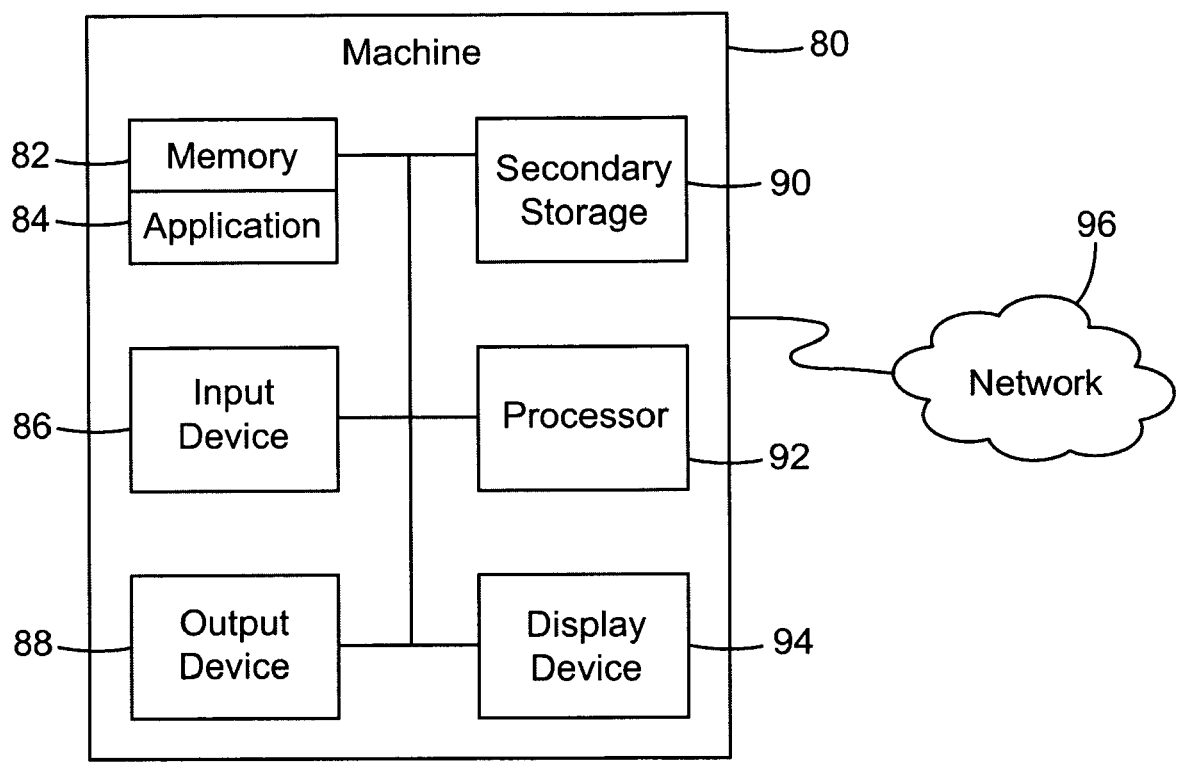
FIG. 6 is a diagram of an exemplary machine for performing OLED device modeling.

FIG. 6 is a diagram of an exemplary machine 80 for use in implementing the system shown in FIG. 5 and the computerized model described above. Machine 80 can include, for example, the following: a memory 82 storing one or more applications 84; a secondary storage 90 for providing non-volatile storage of information; an input device 86 for entering information or commands into machine 80; a processor 92 for executing applications stored in memory 82 or secondary storage 90, or as received from another source; an output device 88 for outputting information, such a printer for providing hard copies of information or speakers for providing information in audio form; and a display device 94 for displaying information in visual or audiovisual form. Machine 80 can include a connection to a network 96 such as the Internet, an intranet, or other type of network.

Figure 7:
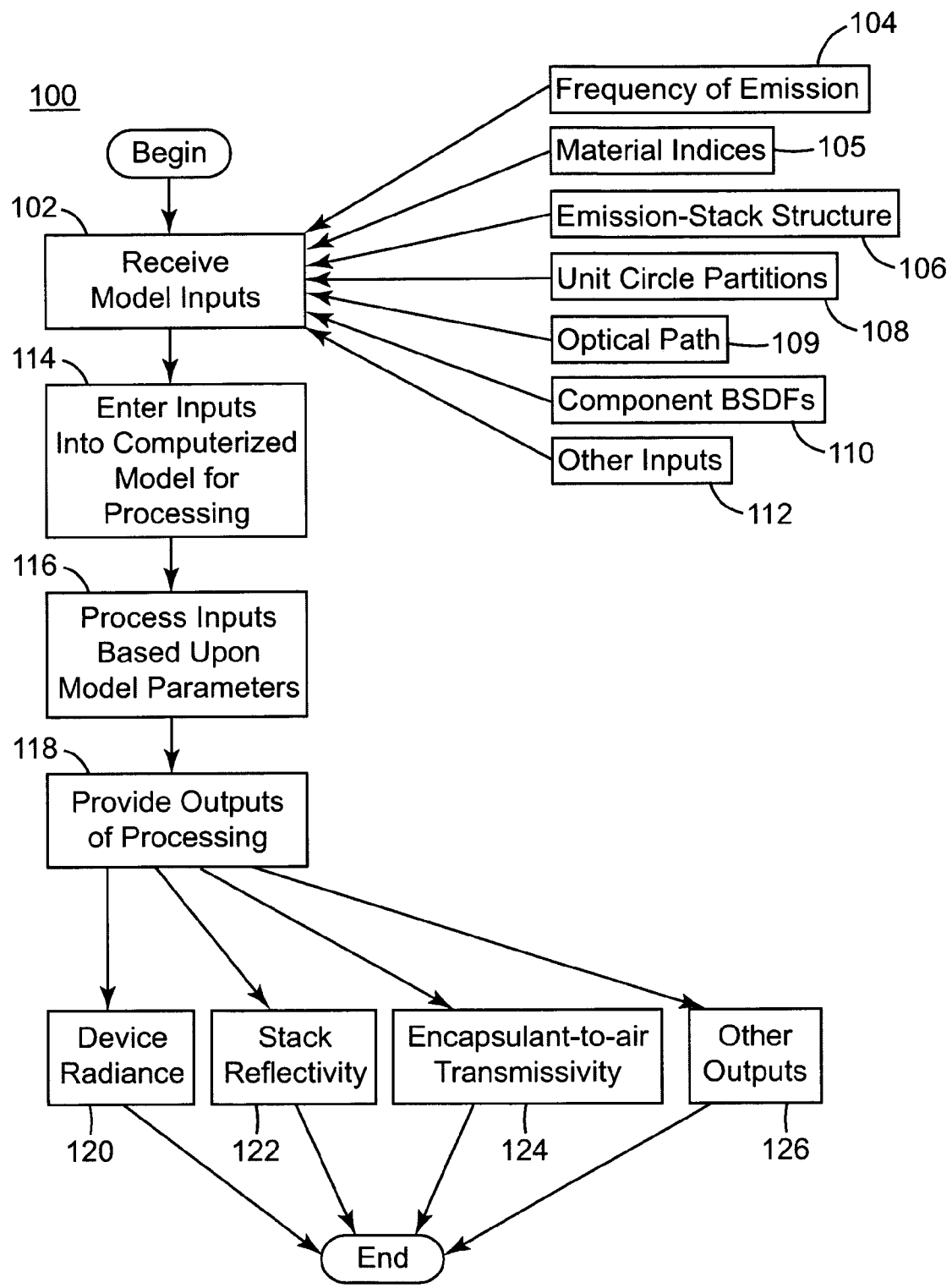
FIG. 7 is a flow chart of a computerized modeling method.

FIG. 7 is a flow chart of a modeling method 100 for use in implementing the system shown in FIG. 5 and the computerized modeling described above. Method 100 can be implemented, for example, in software or firmware modules for execution by processor 92. The modules can also include, for example, associated hardware modules for performing at least part of the processing to implement the modeling. The software, firmware, or hardware can be used to implement the model formulas described above for computerized processing of numerical data representing a particular device construction and for providing corresponding output data, which can be used in design optimization of OLEDs.

In method 100, machine 80 receives model inputs (step 102), which can include, as described in at least the Model Inputs Section, the frequency of emission (step 104) the component material indices (step 105), the emission-stack structure (step 106), the unit circle partitions (step 108), the optical path (step 109) and the component BSDFs (step 110). Method 100 can also receive other inputs (step 112) in certain embodiments. Method 100 enters the inputs into the model, as described above, for processing (step 114). The inputs can be received in any way such as via input device 86. For example, a user may enter the data into matrices for evaluation by the computerized method. Alternatively, other applications can be included to permit easier entry of data by the user, and the other application can then programmatically convert the data into the correct format for processing. For example, a web browser program can query the user to enter data for the particular input parameters and the convert the data into matrices or other appropriate forms for processing by the computerized model.

Method 100 then processes the inputs. Using the computerized model described in at least the Device Architectures and Computer-Implemented Methods Sections, method 100 processes the inputs based upon the model parameters (step 116) and provides outputs of the processing (step 118) for the construction represented in the model. Method 100 can provide the following exemplary outputs as described in at least the Outputs Section: device radiance (step 120), stock reflectivity (step 122), encapsulant to air transmissivity (step 124), and possibly other outputs (step 126).

The processing for step 116 can involve using software, firmware, hardware, or a combination, to implement the mathematical formulas described above and to process the data using the computer-implemented mathematical formulas. The processing can occur on a stand-alone computer or a networked computer. For example, a remote server can receive via network 96 model inputs, process the inputs, and then send the results via network 96 back to the requestor. The transmission can occur, for example, via Transmission Control Protocol/Internet Protocol (TCP/IP) over the Internet, or it can alternatively occur via any network transmission. The remote server can receive many different requests for processing of particular device constructions, perform batch processing of them or alternatively process them when received, and then return the results via a network. The system in that embodiment can, for example, charge a fee for the processing such that customers are charged for receiving computerized modeling of device performance for particular device constructions they submit.

The outputs can be provided as numerical data representing predicted device performance according to the computerized model. Alternatively, an additional application can receive the output data and format it into various forms for display to the user, for example in graphs, charts, diagrams, or other formats. For example, a web browser program can display information that graphically or pictorially illustrates device performance for a particular construction.

While the present invention has been described in connection with an exemplary embodiment, it will be understood that many modifications will be readily apparent to those skilled in the art, and this application is intended to cover any adaptations or variations thereof. For example, various types of machines, mathematical representations of the formulas for the computerized model, and ways to receive the inputs and display the outputs may be used without departing from the scope of the invention. This invention should be limited only by the claims and equivalents thereof.

5 EXAMPLES

5.1 Example 1

Optical-Path Design

As a first example, we present evaluations of the normalized device radiance and the total efficiency of device emission for several optical-path designs on the emission stack of a well-engineered flat-glass device—a Covion Super Yellow bottom-emitting OLED.

Figure 8:
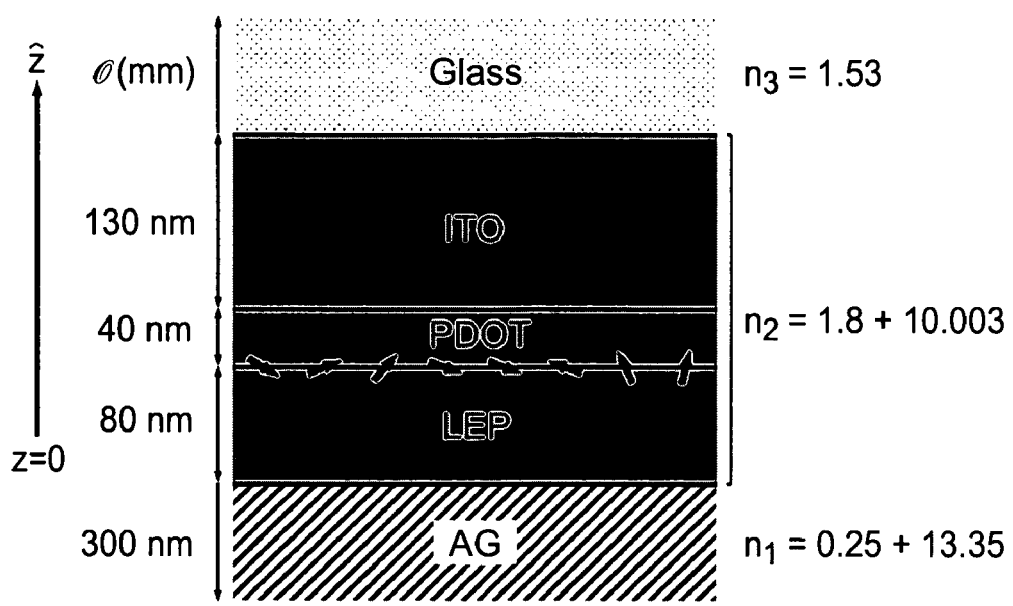
FIG. 8 is diagram illustrating the emission stack the Covion Super Yellow bottom-emitting OLED.

The Covion Super Yellow emission stack is illustrated in FIG. 8. The cathode is a 300-nm thick layer of Ag with a 1-nm coating of Ca or Ba. The Ca/Ba is so thin as to be immaterial to the radiation of molecular emission (and so is not depicted), and the Ag is so thick that it may be considered semi-infinite. "Above" the cathode is 80 nm of Covion Super Yellow light-emitting polymer (LEP), 40 nm of hole-transport material (PDOT), and a 130-nm thick ITO anode. The structure is encapsulated by 0.7 mm of optical-quality glass. The glass is so thick that, like the Ag, it may be considered semi-infinite, insofar as its impact upon the radiation of emission.

The complex indices of refraction of the layers at a frequency corresponding to a free-space wavelength $\lambda_0$ equal to 550 nm are indicated in the figure. Those for the LEP and ITO are derived from measured reflectivities and transmissivities of known thicknesses of these materials coated on bare glass. The measurements indicate comparable values. The index of PDOT is assumed similar to that of ITO and LEP. Thus, the radiation of emission within the Covion OLED may be viewed as occurring from within a layer of index $n_2=1.8+i0.003$, sandwiched between semi-infinite media of indices $n_1=0.125+i3.35$ and $n_3=1.53$.

Molecular emission is modelled by a layer of oscillating point electric dipoles of uniform strength and uniform areal density within the plane $z=z_s$. The orientation of each dipole is assumed uniformly distributed over $4\pi$ steradians of solid angle, and the orientations and relative phases of distinct molecules are assumed to be statistically independent.

Figure 9:
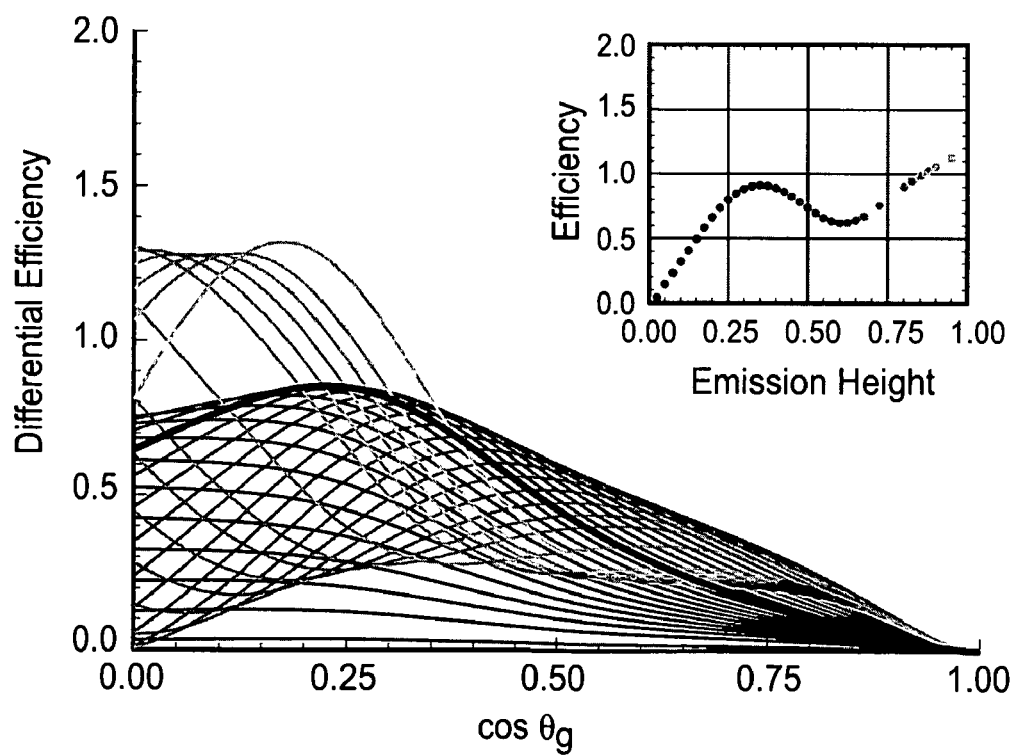
FIG. 9 is a graph of the predicted efficiency of emission into glass for the Covion Super Yellow device at $\lambda_o=550$ nm, and the bold curve pertains to $z_s/T=0.325$, point in the subplot closest to the expected height of emission, $z_s/T=0.32$.

The inset in FIG. 9 depicts the predicted total efficiency of emission into glass, as a function of the height of the dipole layer above the cathode relative to the thickness of the high-index (LEP+PDOT+ITO) layer. We expect localized emission near the LEP/PDOT interface where $z_s/T=80/250=0.32$. The predicted efficiency attains a local maximum value of 0.46 near this value. The main body of FIG. 9 depicts, for each height of emission considered, the "differential efficiency" as a function of the cosine of the emission angle in glass ($\cos\theta_g$), defined so that the total efficiency is the integral of the differential efficiency with respect to $\cos\theta_g$ between 0 and 1. (The differential efficiency is proportional to the normalized radiance emitted into glass times $\cos\theta_g$.) The curves appear quite intricate, and this is the primary point—as the height of emission varies, both the efficiency and the angular distribution of emitted radiance change substantially.

Figure 10:
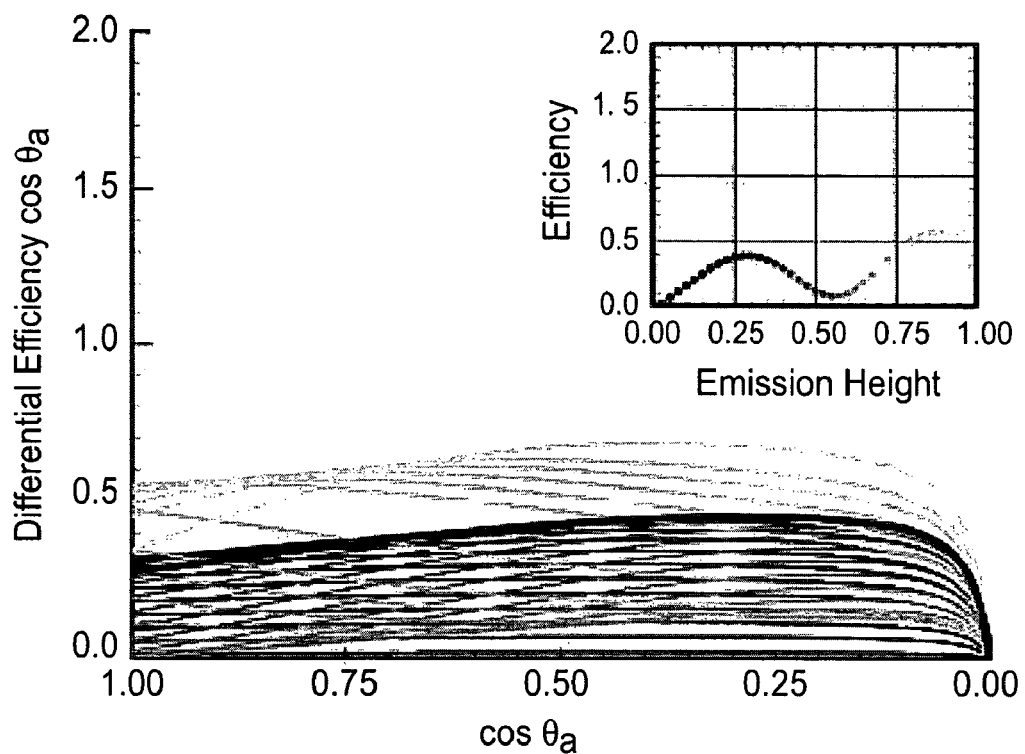
FIG. 10 is a graph of the predicted efficiency of emission into air for flat glass on the Covion Super Yellow device at $\lambda_o=550$ nm, and the bold curve pertains to $z_s/T=0.325$.

Our baseline for assessing the efficacy of candidate optical-path designs is the normalized device radiance and the total efficiency of device emission for a flat glass device. These may be evaluated by the matrix method of Section 3.3, utilizing $\underline{\underline{R}}^{(b)}$ and $\underline{\underline{T}}^{(b)}$ of a simple plane interface between media of index $n_b=1.53$ and $n_a=1.00$, or by an analytic approach. The two approaches yield indistinguishable results. FIG. 10 depicts the total efficiency of device emission as a function of the relative height of emission, and in the main body the differential efficiency of device emission divided by $\cos\theta_a$ (proportional to the normalized device radiance) as a function of the emission angle in air ($\cos\theta_a$). The total efficiency attains a local maximum value of 0.19 at a value of $z_s/T$ slightly smaller than 0.32. The reduction in the maximum efficiency reflects the total internal reflection of radiance within the glass for $\cos\theta_g<0.76$. The shift in the emission height of maximum efficiency reflects changes in the relative contributions of $\cos\theta_g<0.76$ and $\cos\theta_g>0.76$ to the total efficiency into glass which accompany the changes in angular distribution with emission height.

Assuming emission at the LEP/PDOT interface, the total electromagnetic efficiency of the flat-glass device is 19 percent. The emitted radiance is suppressed near normal, and exhibits a gradual 40-percent rise between normal and $\theta_a \sim 75°$, followed by a gradual decay and eventual precipitous drop off near grazing. This predicted angular distribution is in qualitative agreement with those measured for several 4 mm-by-4 mm Covion devices. Differences in details can be attributed to possible distributed emission heights, inaccuracies in our assumed indices of refraction, and experimental artifacts associated with finite sample size.

As a first example of a glass-air interfacial extraction scheme, we consider a sheet of 3M Brightness Enhancement Film (BEF) laminated points up in optical contact with the flat-glass surface of the Covion device. The BEF is modelled as an index $n=1.586$ non-scattering but slightly-absorbing plane-parallel layer of optical thickness $\tau=0.010$ (the PET "land" of the microstructured film) underlying a 90-degree sawtooth interface between index $n_b=1.586$ and $n_a=1.000$ media (the cast acrylic microstructures). Thus, the optical path consists of 1) a plane interface between index $n_b=1.53$ and $n_a=1.586$ media, 2) a plane-parallel homogeneous but absorbing layer of optical thickness $\tau=0.010$, and 3) a deterministic sawtooth interface between index $n_b=1.586$ and $n_a=1.000$ media.

Figure 11:
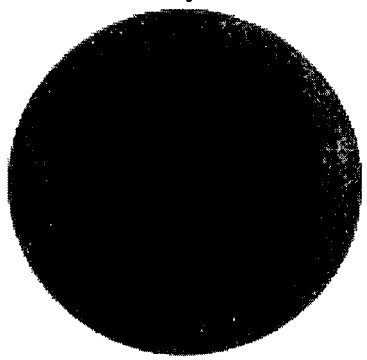
FIG. 11 is a diagram illustrating the normalized device radiance emitted when a sheet of BEF is laminated in optical contact with the flat-glass Covion device.
Figure 11:
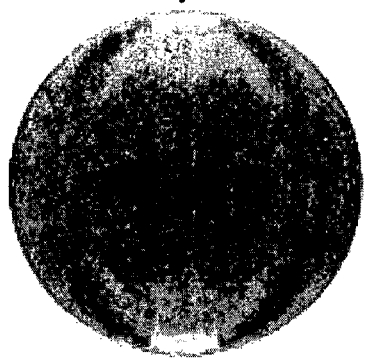
Figure 11:
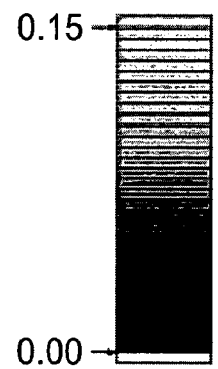

The left-hand subplot of FIG. 11 depicts for reference the normalized device radiance emitted by the flat-glass device into directions on the upwards-pointing unit hemisphere, as a function of the projection of position on the hemisphere into the horizontal plane. The radiance exhibits the features noted previously—a suppressed value near normal, a gradual rise until $\theta_a \sim 75°$, and a gradual fall. The precipitous drop off near grazing is not clearly evident because near-grazing angles occupy a very-thin annulus near the perimeter of the circle. The total efficiency of device emission is the integral of the normalized device radiance over the domain of the unit circle; the value is 0.19, as noted previously. The right-hand subplot depicts the normalized device radiance when BEF is laminated to the flat-glass device. The angular distribution of emitted radiance is substantially altered. Most notably, the radiance exhibits bright peaks near $\theta_a \sim 70°$ in directions nearly parallel to the grooves in the BEF (vertical in FIG. 11). The total efficiency is also substantially altered, now 0.27 vs. 0.19, a 42-percent relative increase.

Figure 12:
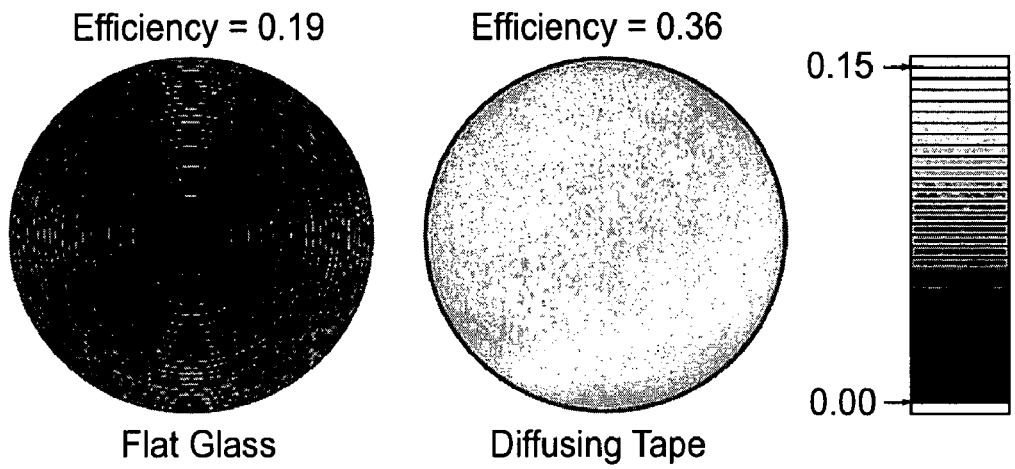
FIG. 12 is a diagram illustrating the normalized device radiance emitted when 3635-70 is laminated in optical contact with the flat-glass Covion device.

As an alternate extraction scheme, we consider the lamination of a diffusing "tape" to the flat-glass device. For specificity, we consider 3M ScotchCal 3635-70, a film commonly used in the electric-sign industry. Based upon measured reflectivities, transmissivities, and patterns of transmitted radiance for the free-standing film, 3635-70 is modelled as an index $n=1.50$ host possessing random heterogeneities characterized by a Henyey-Greenstein asymmetry parameter $g=0.800$, a scattering albedo $\omega=0.9998$, and an optical thickness $\tau=6.00$ Thus, the optical path now consists of 1) a plane interface between $n_b=1.53$ and $n_a=1.50$ media, 2) a plane-parallel layer of random heterogeneties characterized by $g=0.800$, $\omega=0.9998$, and $\tau=6.00$, and 3) a plane interface between $n_b=1.50$ and $n_a=1.00$. The right-hand subplot of FIG. 12 depicts the normalized device radiance emitted for this construction (with the flat-glass emission repeated on the left for reference). The emission is again substantially altered, but now so as to nearly double the total efficiency, while preserving the azimuthal symmetry of the radiance and creating a pseudo-Lambertian pattern, with a mild elevation near normal and darkening near grazing.

Figure 13:
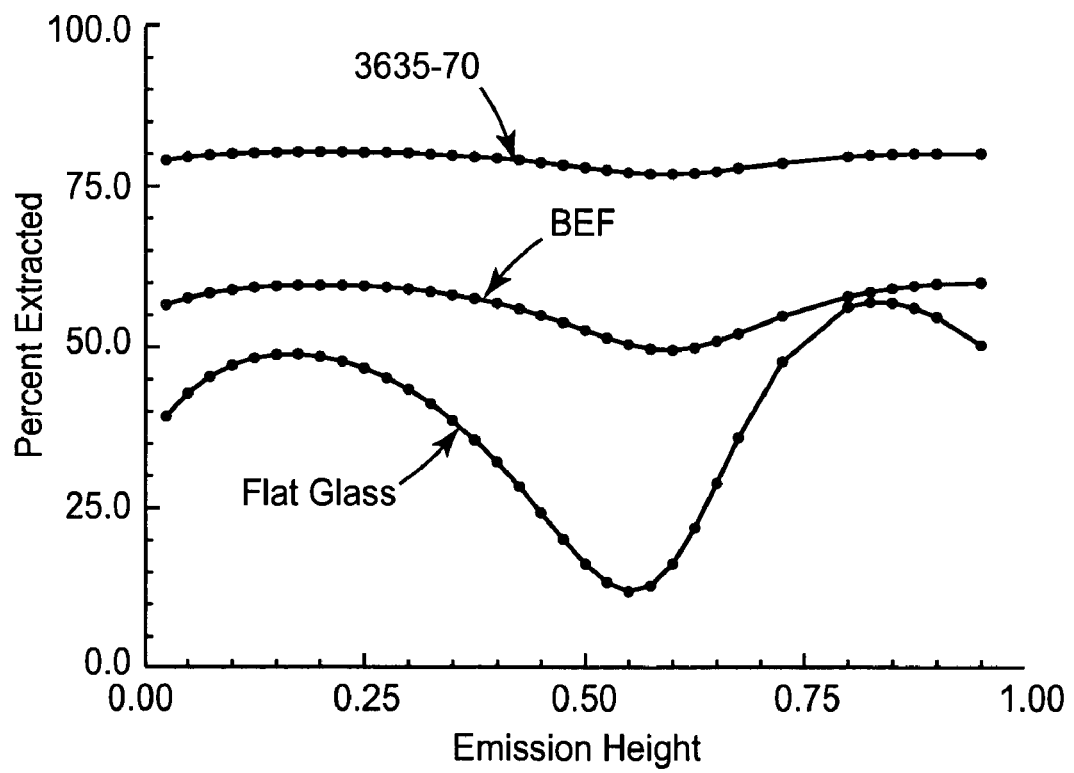
FIG. 13 is a graph of the efficacy of flat-glass, BEF, and 3635-70 glass-air extraction.

Concerning the relative merits of these extraction schemes, the 3635-70 is clearly preferred for its higher total efficiency, and may often be preferred for its pseudo-Lambertian pattern. For example, we demonstrate below how gain-enhancement stacks engineered for pseudo-Lambertian LCD backlights yield similar enhancements when applied to the Covion device with 3635-70 extraction. A third desirable attribute of diffuse extraction is illustrated in FIG. 13, which depicts the efficacy of flat-glass, BEF, and 3635-70 extractions (defined as the ratio of the total device efficiency to the total efficiency into glass), each as a function of the relative height of molecular emission. The efficacy of 3635-70 is not only highest, but also nearly independent of the substantial variations in angular distribution of radiance within the glass which accompany changing emission height. Scattering randomizes directions, so that diffuse extraction rapidly "forgets" the angular distribution of incident radiance as the number of recycling events increases. Because of this attribute, the emission stacks of devices which exploit diffuse extraction can be designed so as to simply maximize the total efficiency of emission into glass, without significant regard to the angular distribution of the radiance. The result will achieve approximate global maximization of the total device efficiency. We exploit this convenience in Section 5.2.

Figure 14:
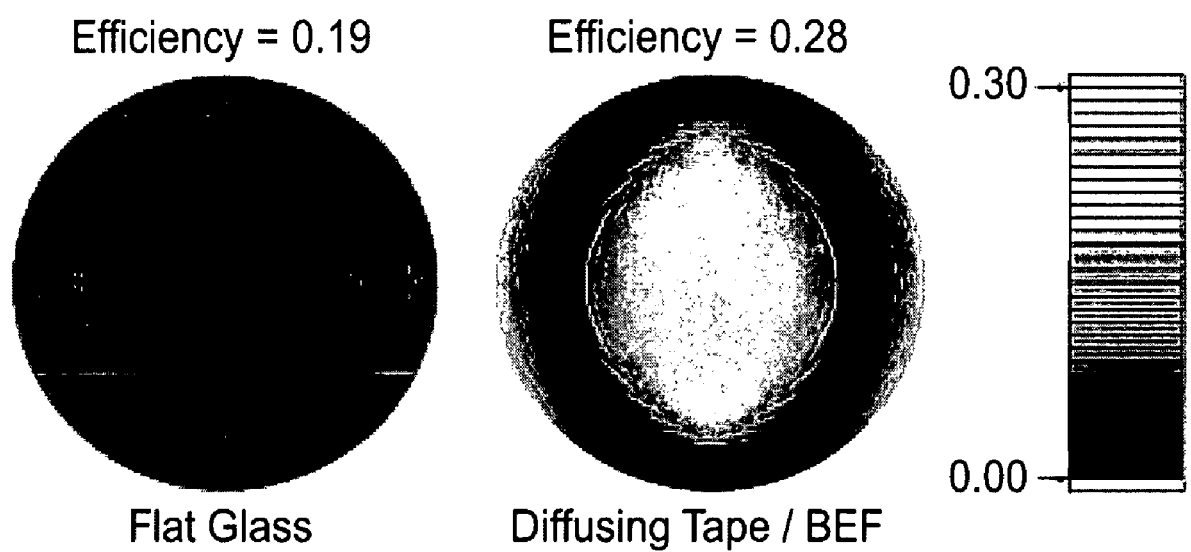
FIG. 14 is a diagram illustrating the normalized device radiance emitted when points-up BEF is applied with an interleaving air gap to a Covion device utilizing 3635-70 diffuse extraction.

Building upon the desirable attributes of diffuse extraction, we now consider the points-up application of a single sheet of BEF "on top" of the 3635-70, without adhesive and therefore with (at most locations) an interleaving air gap. This construction is similar to that used in many LCD displays. The optical path now consists of 1) a plane interface between index $n_b$=1.53 and $n_a$=1.50 media, 2) a plane-parallel layer of random heterogeneities characterized by g=0.800, ω=0.9998, and τ=6.00, 3) a plane interface between index $n_b$=1.50 and $n_a$=1.00 media, 4) a plane interface between index $n_b$=1.000 and $n_a$=1.586 media, 6) a plane-parallel homogeneous but absorbing layer of optical thickness τ=0.010, and 7) a deterministic sawtooth interface between index $n_b$=1.586 and $n_a$=1.000 media. The right-hand subplot of FIG. 14 depicts the normalized radiance for this construction. (Note that the grey scale is altered relative to FIGS. 11 and 12.) The total efficiency is reduced relative to that for 3635-70 without BEF, but the angular distribution is altered to enhance normal and near-normal emission, creating a "cats-eye" pattern. Both the reduction in total efficiency and the normal enhancements are familiar characteristics for BEF applied to LCD backlights.

Clearly, the addition of BEF is a detriment insofar as total efficiency is concerned, yet a significant benefit if, for example, normal emission is the priority. This example illustrates an important design consideration—the optimum extraction scheme depends upon the relative value assigned to various characteristics of the emission.

Table 1 reinforces the concept, by summarizing the total efficiencies of device emission and the normal device radiance (relative to flat glass) for each of the four extraction schemes considered, as well as a fifth consisting of a second sheet of BEF, applied with grooves rotated 90 degrees relative to the first and with an interleaving air gap, on top of the 3635-70/BEF. The maximally-efficient design (3635-70) is different than that which achieves the maximum normal radiance (3635-70 with crossed BEF). Note also that while the total efficiency of device emission is constrained to be no larger than the total efficiency of emission into glass (0.46 for the Covion emission stack), there is, in principle, no limit upon our ability to enhance the radiance in a particular direction. Crossed BEF on 3635-70 achieves a normal radiance which is more than five times greater than that for the flat-glass device.

TABLE 1

The total efficiency of device emission and the normal radiance relative to flat glass for five example glass-air extraction schemes

| Design | Total Efficiency | Normal Radiance |
|---|---|---|
| Flat Glass | 0.19 | 1.00 |
| BEF in Optical Contact | 0.27 | 1.69 |
| 3635-70 in Optical Contact | 0.36 | 2.79 |
| 3635-70 with BEF | 0.28 | 4.23 |
| 3635-70 with Crossed BEF | 0.18 | 5.34 |

5.2 Example 2

Emission-Stack Design

Figure 15A:
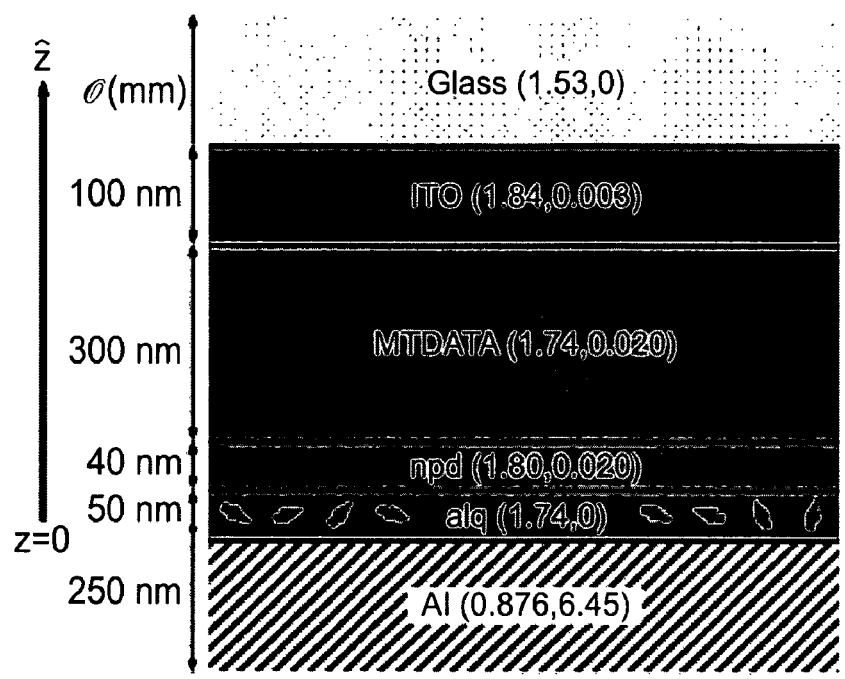
FIGS. 15a and 15b are an example of a small-molecule emission stack in the diagram of FIG. 15a and its predicted efficiency of emission in the graph of FIG. 15b.

FIG. 15*a* depicts an example small-molecule OLED emission stack. The light-emitting layer consists of 50 nm of Alq, the upper 30 nm of which are doped so as to enable local molecular emission at a frequency corresponding to a free-space wavelength of approximately 530 nm. The light-emitting layer is sandwiched between an Al cathode and an ITO anode, the anode being separated from the light-emitting layer by two layers of hole-transport material (40 nm of npd and 300 nm of MTDATA). The device is fabricated upon a glass substrate (encapsulant). The complex indices of refraction of each component material, measured by ellipsometry, are indicated in the figure. The measured imaginary part of the index of Alq is $n''_{Alq}$=0.020—the corresponding loss tangent is approximately $10^{-2}$. Such a large loss tangent in the light-emitting layer would render efficient emission nearly impossible due to loss in the near field of the dipoles. We assume that the measured value of $n''_{Alq}$ is in error, and replace it with $n''_{Alq}$=0. The n" values of the remaining components may also be in error, but we accept them for the purpose of illustration because their impact upon predicted efficiencies is less severe.

Figure 15B:
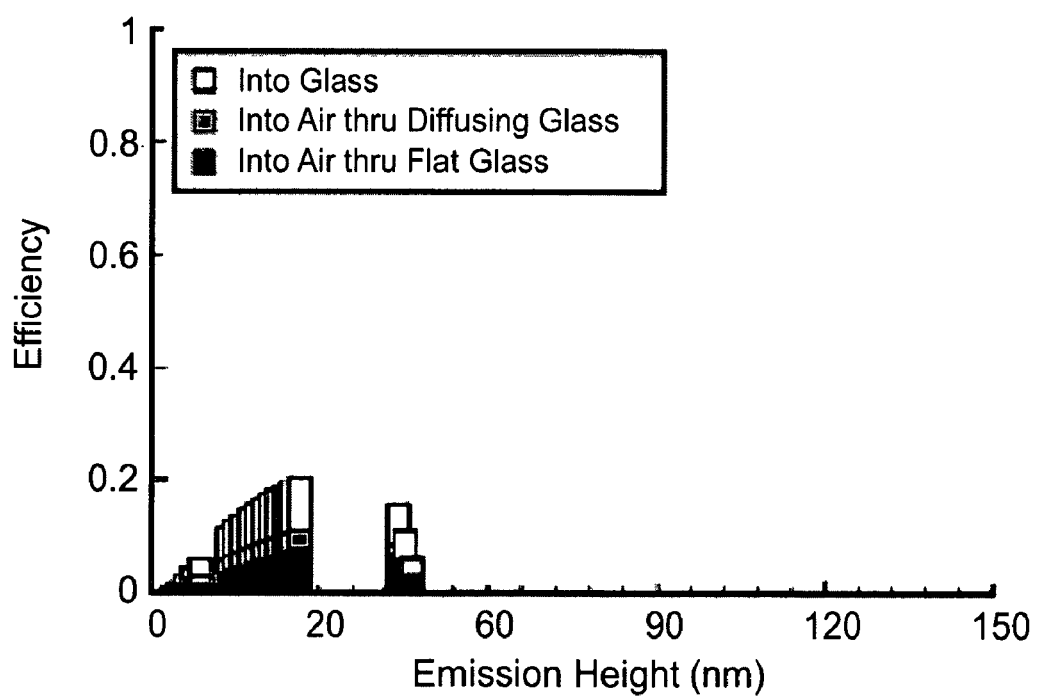

FIG. 15*b* depicts the predicted total efficiency of emission into glass, into air through flat glass, and into air through glass containing an embedded loss-free diffusing layer of optical thickness τ=15 and Henyey-Greenstein asymmetry parameter g=0.950, each as a function of the height of molecular emission above the cathode. Actual emission is expected to occur within the upper 60 percent of the Alq layer—i.e. for emission heights between 20 and 50 nm. The efficiencies of emission are very low—approximately 20 percent into glass, and 10 percent or less into air.

Figure 16A:
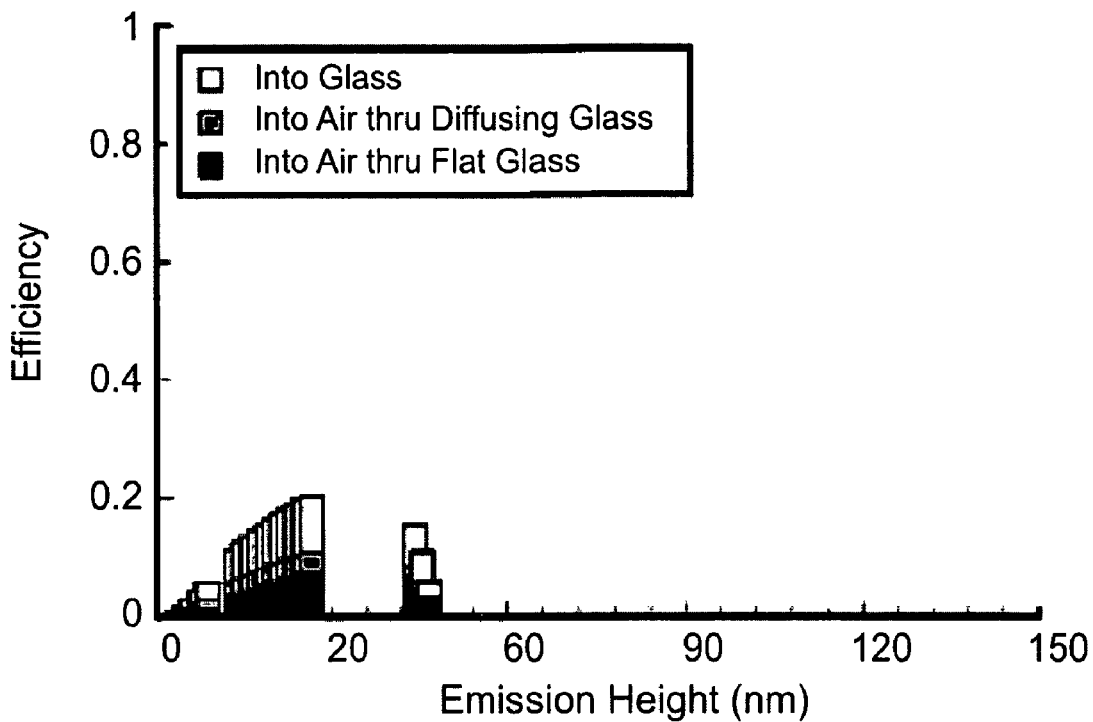
FIGS. 16a and 16b are graphs illustrating the impact upon efficiency of increasing the thickness of the light-emitting layer.
Figure 16B:
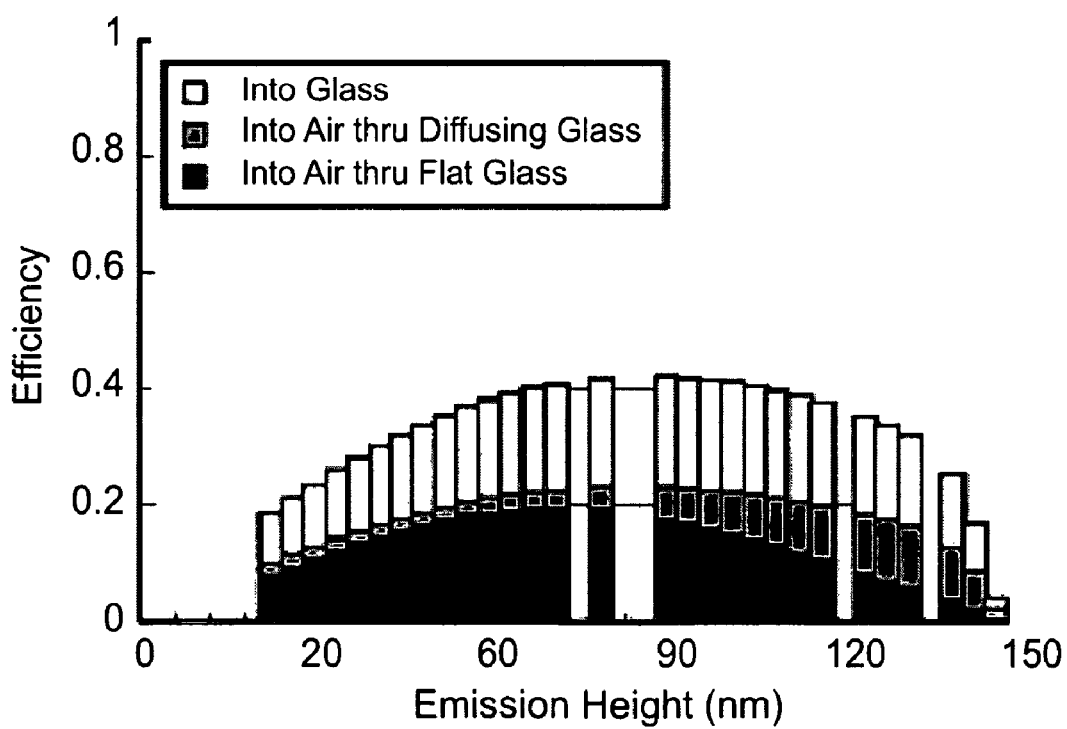

Even when the light-emitting layer is entirely free of absorption (as considered above) near-field loss in adjacent layers can severely limit the efficiency when molecular emission occurs near the interface with these layers. There exists, therefore, a minimum thickness for which efficient emission is possible. FIG. 16*a* depicts the efficiency of emission of the example device when the light-emitting layer is 50 nm thick. This is the same result as is depicted in FIG. 15*b*. FIG. 16*b* depicts the efficiency when the thickness of the light-emitting layer is increased to 150 nm. The efficiencies for molecular emission near the center of the layer are approximately doubled.

We note that our predicted efficiencies invariably virtually vanish for molecular emission sufficiently close to the cathode. Other models, which do not consider the resistance to electric-dipole oscillations in the vicinity of lossy materials would predict a maximum in the efficiency at the cathode for those dipoles which are vertically oriented. Our ability to discern the universal inefficiency of molecular emission near the cathode is a consequence of our novel ability to evaluate dipole power consumption. Our predicted efficiencies invariably vanish for molecular emission sufficiently close to the top of the light-emitting layer as well, as long as the overlying hole-transport material possesses a finite absorptivity. Degradations are invariably more local, because the absorptivities of hole-transport materials are invariably less than those of metals.

Figure 17A:
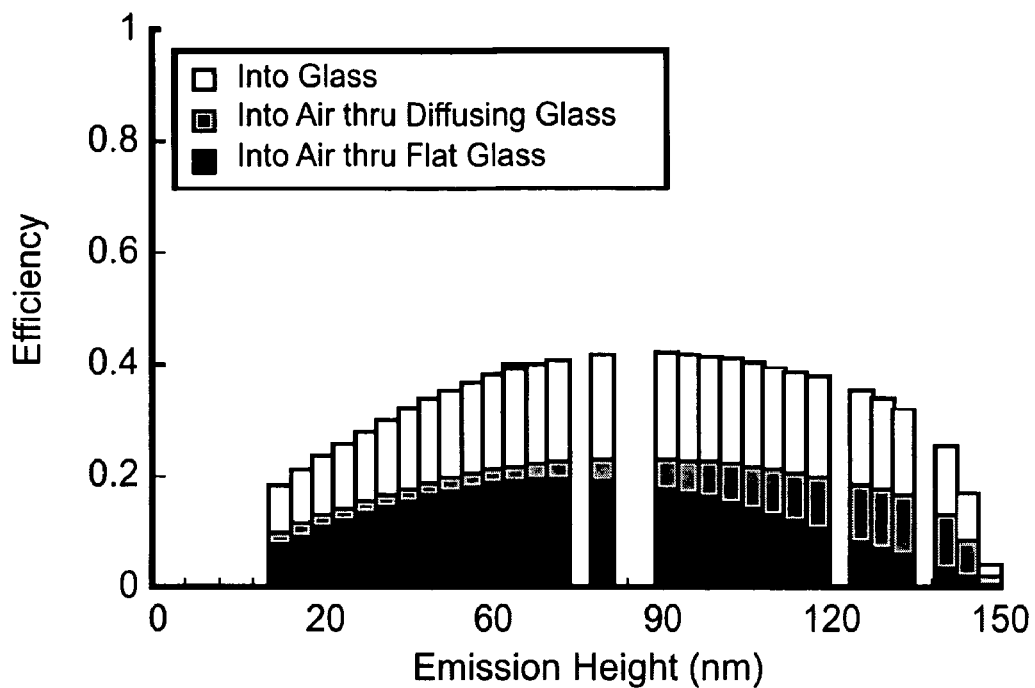
FIGS. 17a-17d are graphs illustrating the impact of reduced MTDATA and npd absorptivities upon efficiency and stack reflectivity.
Figure 17B:
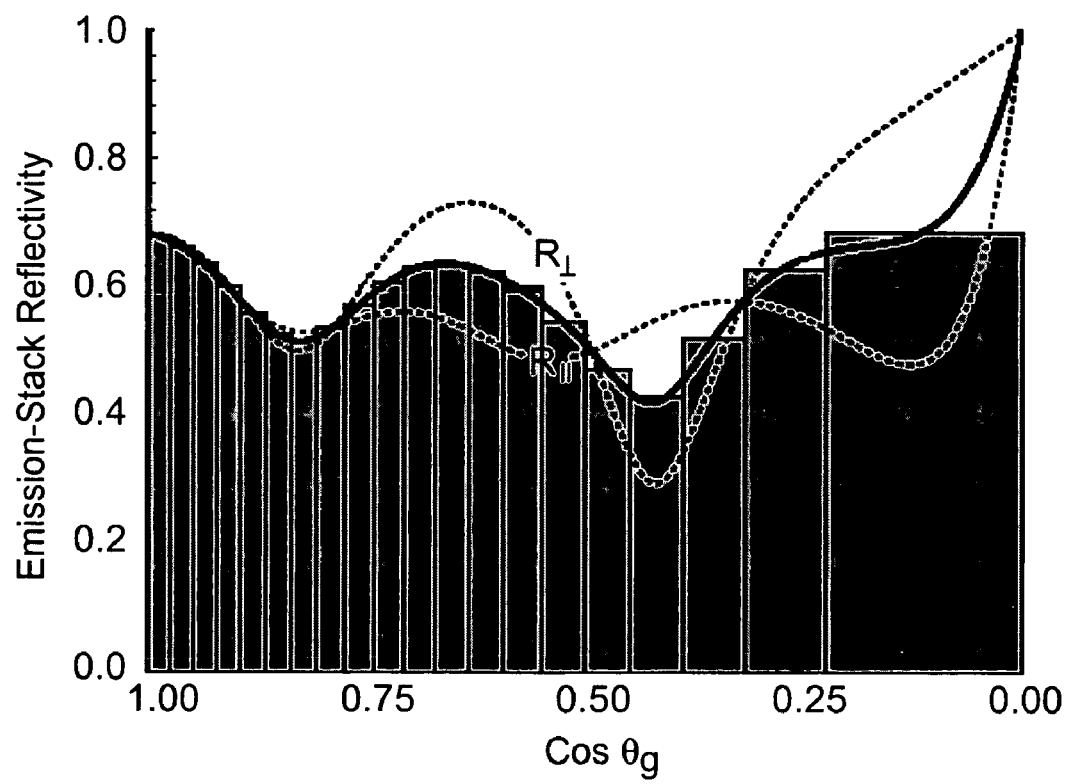
Figure 17C:
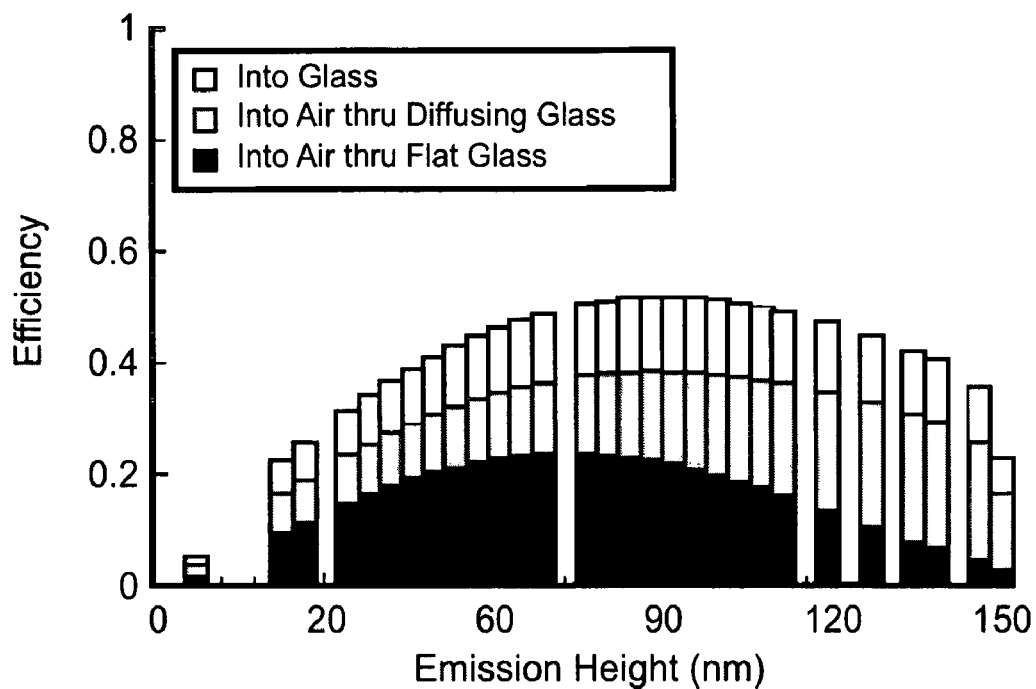
Figure 17D:
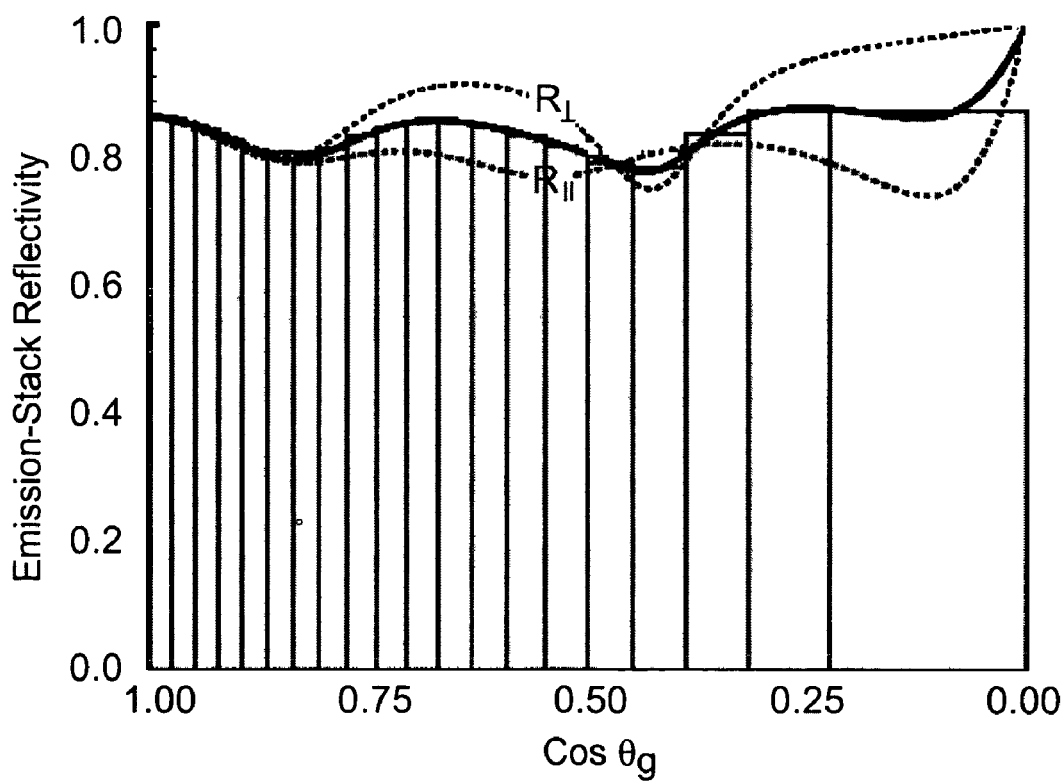

The absorptivities of the npd, MTDATA, and ITO layers limits the efficiency by both absorbing light which might otherwise have been radiated into the glass, and decreasing the reflectivity of the ITO/MTDATA/npd/Alq/Al stack for incidence from within the glass, thereby diminishing the efficacy of any glass-air extraction scheme that relies upon recycling. FIG. 17*a* depicts the efficiency of emission of the example device when the thickness of the light-emitting layer has been increased to 150 nm. This is the same result as is depicted in FIG. 16*b*. FIG. 17*c* depicts the impact of now decreasing the n" values of npd and MTDATA by an order of magnitude. (The measured n" for ITO is already an order of magnitude smaller than those of npd and MTDATA, and so is retained unchanged.) The n" values of all the emission-stack components overlying the cathode are then of order $10^{-3}$ or less. The efficiency into the glass increases due to the first effect identified above. The efficiency into air through flat glass increases proportionally, because flat-glass extraction does not rely heavily upon recycling. The efficiency into air through diffusing glass increases more than proportionally, because this extraction scheme relies heavily upon recycling so that both the first and second effects are felt. FIGS. 17*b* and 17*d* depict the reflectivity of the stack for incidence from within the glass for each design. The increase in reflectivity which is responsible for the increase in recycling efficiency is clearly evident.

In the visible, the imaginary part of the index of refraction of conducting solids generally reflects damping of bound-electron resonances, as opposed to the drift of free electrons. It is therefore entirely reasonable to hope for low-loss materials which nevertheless exhibit a significant dc conductivity to support the transport of charge. Given our current uncertainty regarding the values of n" measured to date, it is entirely possible that the actual values for npd and MTDATA are of order $10^{-3}$ or less. Comparison of FIGS. 17*a* and 17*c* illustrates the criticality of component-material absorptivities to device performance. Preliminary results of advanced dielectric characterizations designed to resolve ambiguities concerning the absorptivities of OLED materials are described in Section 5.3.

Figure 18A:
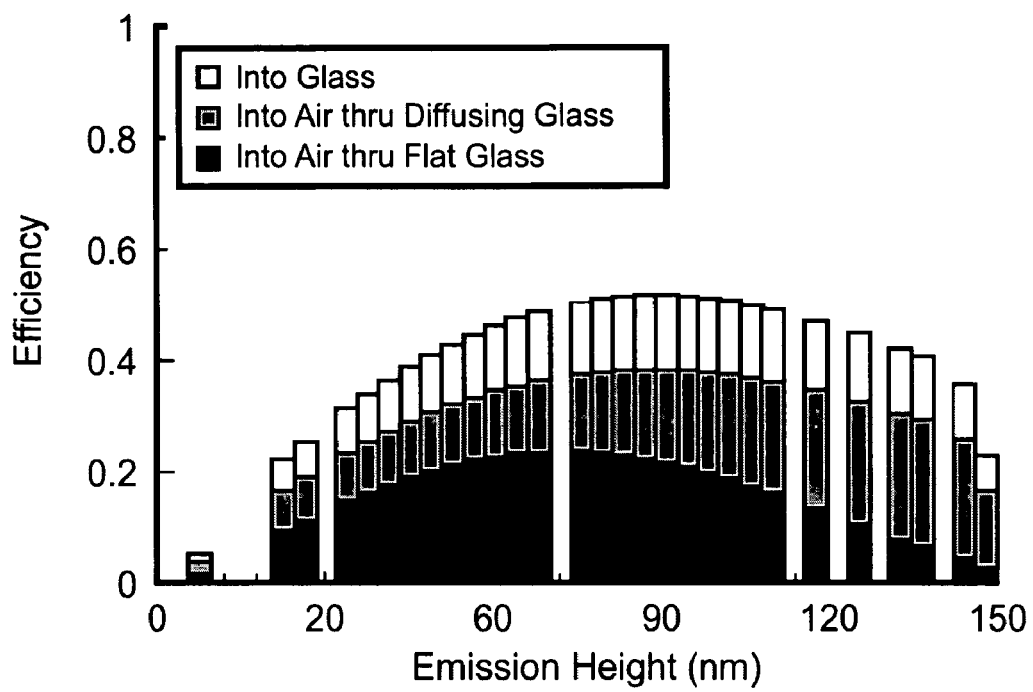
FIGS. 18a and 18b are graphs illustrating the impact upon efficiency of increasing the index of the encapsulant from 1.53 to 1.80.
Figure 18B:
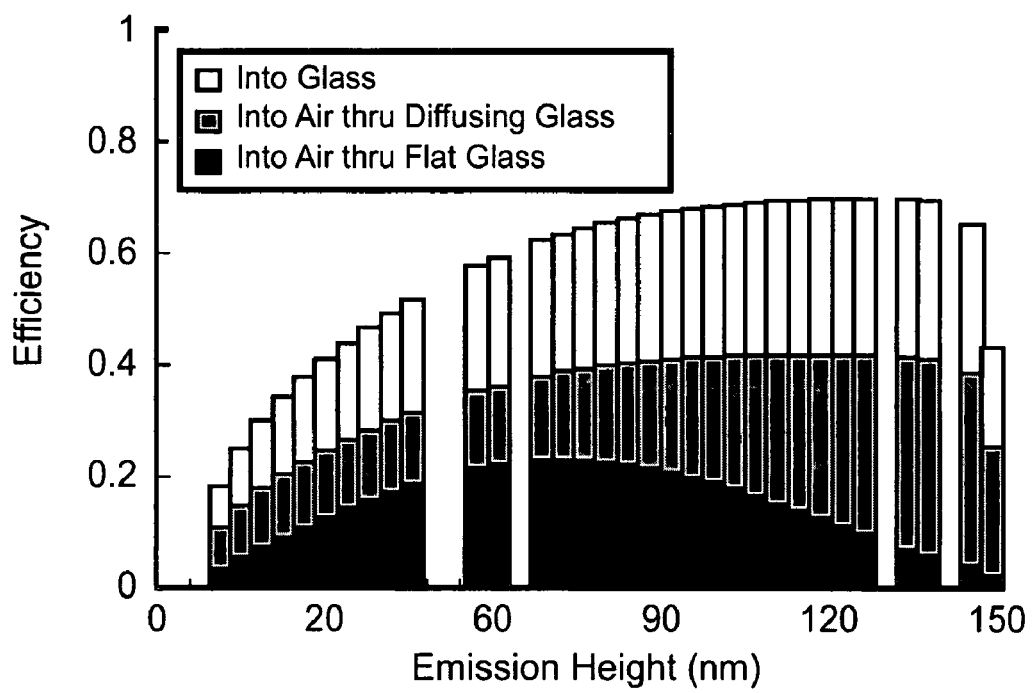

The lowest index component of the emission stack is almost always the encapsulant. Increasing its index so as to approach that of the light-emitting layer can dramatically increase the efficiency of emission as long as any interleaving layers (such as the hole-transport or ITO layers) of substantially smaller index are but a fraction of an immersed wavelength thick. FIG. 18*a* depicts the efficiency of emission of the example device when the thickness of the light-emitting layer is increased to 150 nm and the n" values of npd and MTDATA are decreased by an order of magnitude. This is the same result as is depicted in FIG. 17*c*. FIG. 18*b* depicts the result of increasing the index of the encapsulant from 1.53 to 1.80. The efficiency into the encapsulant, and the efficiency into air through a diffusing encapsulant, increase roughly in proportion to one another. Note, however, that the efficiency into air through a flat encapsulant-air interface remains unchanged. The transmissivity of the interface decreases just as fast as the efficiency into the encapsulant increases because the critical regime at the encapsulant-air interface expands with increasing index of the encapsulant. Observations of just flat-encapsulant device emission would incorrectly indicate that high-index encapsulants are ineffective in increasing the efficiency.

It is established that the index of glass can be increased substantially by doping with, for example, high-index oxides. 3M currently produces such glasses, with indices as large as 2.26, in the form of retroreflective beads. The index of a polymer encapsulant will depend upon the base polymer used, and can generally be increased beyond this value by loading with nanoparticles (whose linear dimensions are much less than an immersed wavelength) of high-index oxides.

Figure 19A:
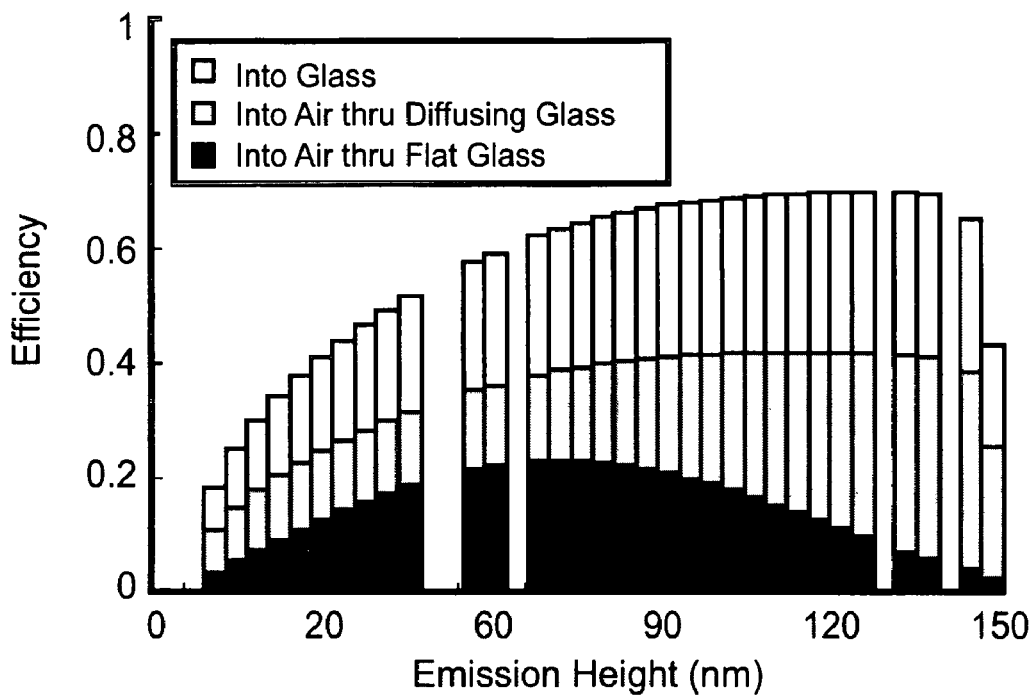
FIGS. 19a-19d are graphs illustrating the impact of reduced MTDATA thickness and the substitution of Ag for Al.
Figure 19B:
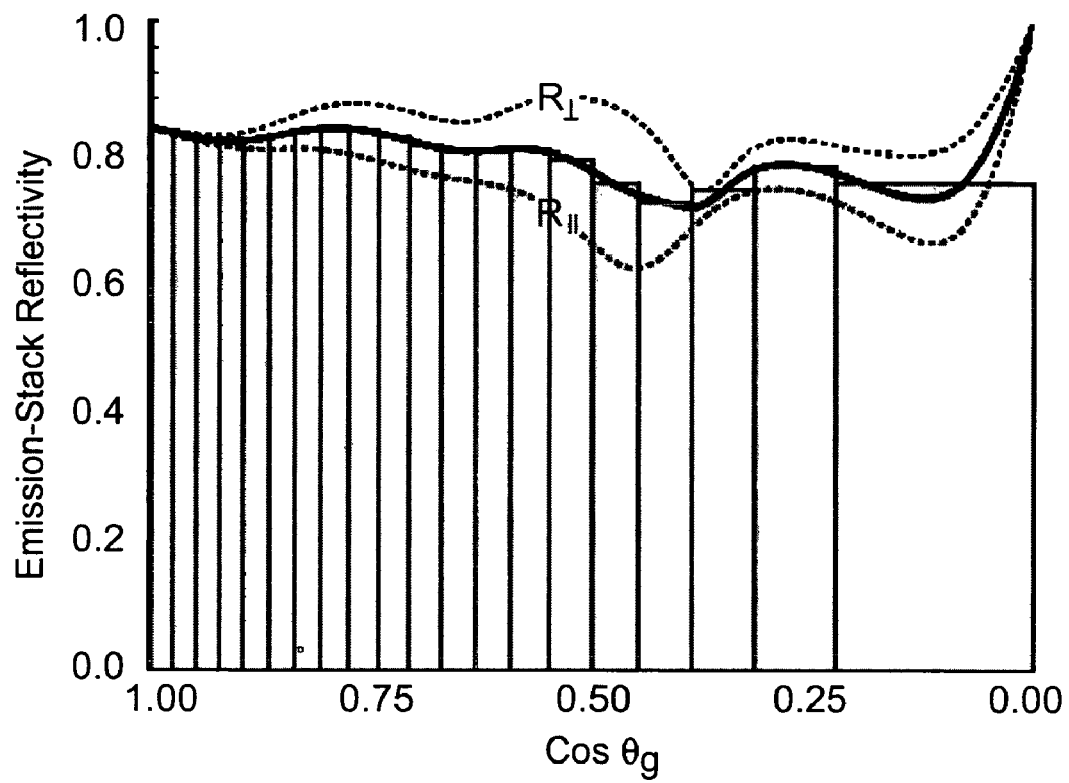
Figure 19C:
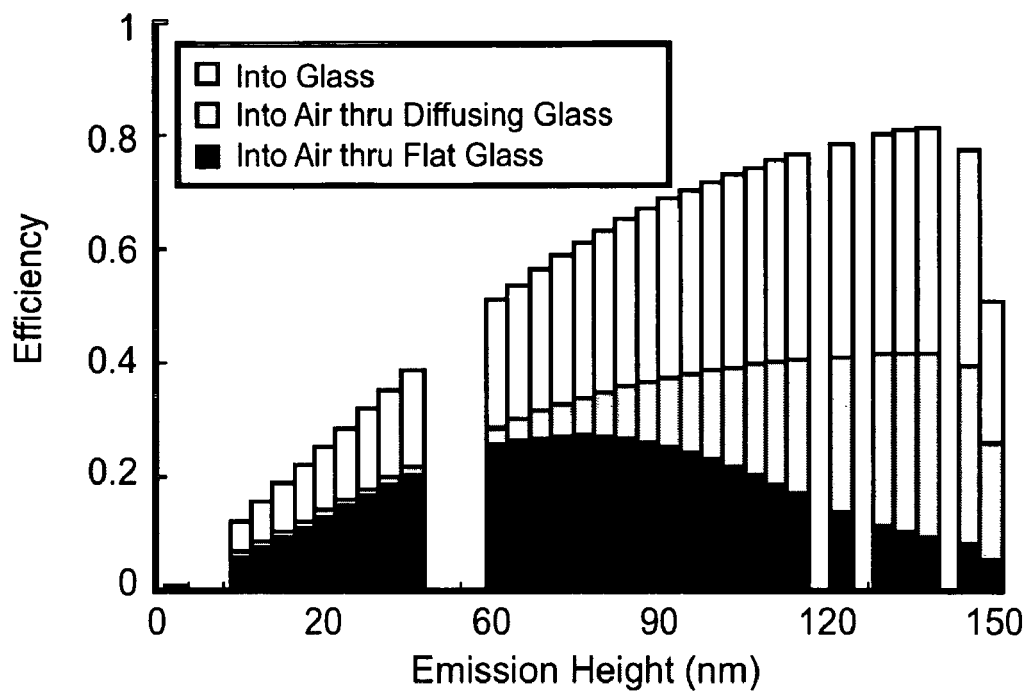
Figure 19D:
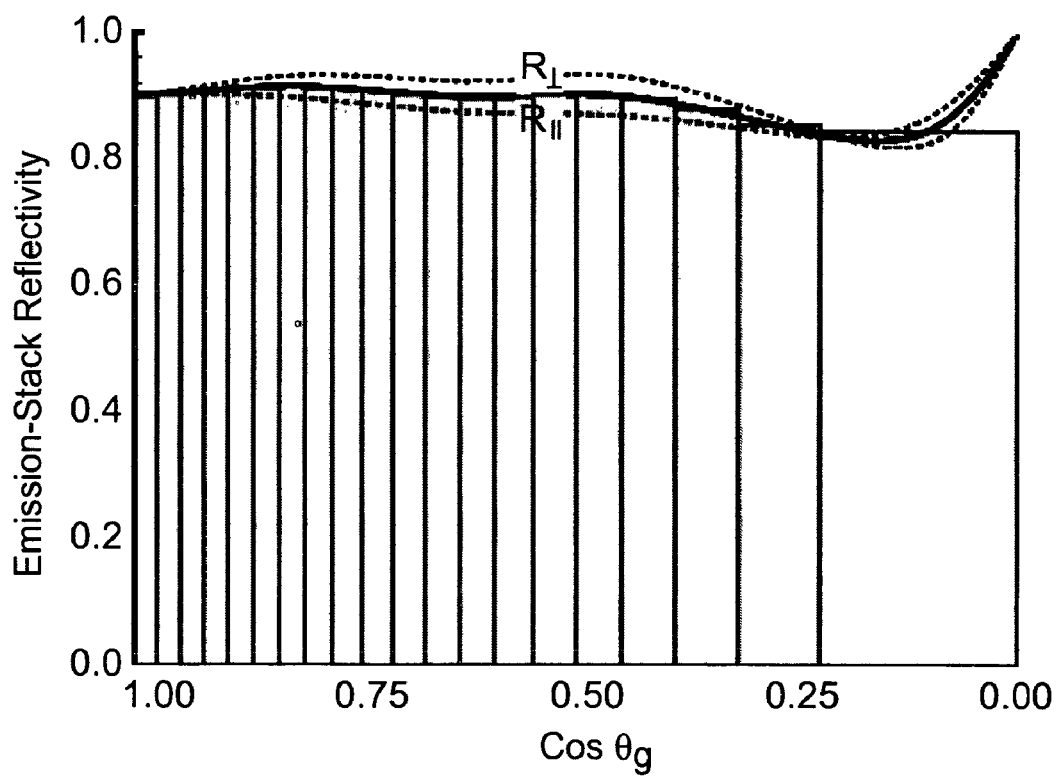

As a final enhancement, we consider reduction of the thickness of MTDATA from 300 to 75 nm, and the simultaneous substitution of Ag for Al, in order to further increase the reflectivity of the stack and thus the efficiency of emission through diffusing glass. FIG. 19*a* depicts the efficiency of emission of the example device when the thickness of the light-emitting layer is increased to 150 nm, the n" values of npd and MTDATA are decreased by an order of magnitude, and the index of the encapsulant is increased to 1.80. This is the same result as is depicted in FIG. 18*b*. FIG. 19*b* depicts the reflectivity of this stack for incidence from within the encapsulant. (This differs from FIG. 17*d* only because incidence is now from within a medium of index 1.80, as opposed to 1.53.) FIG. 19*c* depicts the efficiency when the thickness of MTDATA is reduced to 75 nm and Ag is substituted for Al. FIG. 19*d* depicts the reflectivity of this modified stack for incidence from within the encapsulant. The efficiency into the encapsulant changes significantly, not so much due to the change in thickness of the waveguide (with the high-index encapsulant the "guide" is effectively open at its upper boundary), but more so due to changes in boundary conditions at the lower boundary associated with the substitution of Ag for Al. Of greater significance than the change in efficiency into the encapsulant, the efficiency into air through a diffusing encapsulant is now a larger fraction of the efficiency into the encapsulant, due to the increased reflectivity of the stack. We note that reducing the thickness of MTDATA alone would result in a stack reflectivity that is limited by the inherent dielectric characteristics of Al. The substitution of Ag for Al is critical to attaining stack reflectivities in excess of 90 percent.

The overall increase in efficiency into air is from 10 percent for the unmodified design, to nearly 60 percent. These gains are realized by merely invoking a handful of simple design rules that we have mined from our model understanding to date. Further enhancements (albeit, probably minor ones) are possible using numerical optimization initiated about our rule-driven design.

5.3 Example 3

Material Characterization

As a final example we consider not specific results of the model, but rather example results of material dielectric characterizations performed in support of the model.

As intimated in Section 5.2, dielectric characterizations performed upon OLED light-emitting materials via the traditional approach of ellipsometry have often yielded loss tangents at frequencies near the center of the emission band far in excess of $10^{-3}$, and values near the blue edge of the band significantly in excess of $10^{-2}$. This aspect of these results is now suspect, as it contradicts an expectation of our newfound theoretical understanding. We believe the measured loss tangents are in error, not because of any fundamental failing of ellipsometry, but rather because of constraints inherent in the software tools used to analyze the data. Specifically, the tools fit measured reflectivities to a presupposed general form for the dielectric dispersion. In doing so, we believe they often sacrifice relative accuracy in n" in regimes of low absorptivity (such as the emission band of OLED light-emitting materials) in favor of "nailing" the fit in regions of large n". To test our assertion, we have devised alternate experiments and analyses capable of discerning the dielectric response of OLED materials at frequencies throughout the visible without the imposition of any presupposed constraints upon the frequency dependence of the response.

Our method measures the normal-incidence reflectivity and transmissivity of an uncoated glass slide (0.7-mm thick in our experiments), and then the normal-incidence reflectivity and transmissivity of the same (or an identical) slide with a known thickness (order 100 nm) of the subject OLED material coated on one side. The reflectivity and transmissivity of the coated slide are measured for incidence from both sides—the transmissivities are necessarily the same by reciprocity, but the reflectivities may differ. From these data we first extract n' and n" of the glass by inverting the known functional dependence of the uncoated reflectivities and transmissivities upon n" and n", and then n' and n" of the OLED material from n' and n" of the glass and the coated-slide measurements. Only reflectivities and transmissivities measured at any given frequency affect our estimates of n' and n" at that frequency. Thus, the dispersions we arrive at result entirely from the frequency dependence of the data, independent of any presupposed general form.

While this approach has proven useful and accurate for the OLED materials characterized to date, it possesses many shortcomings. It is quite sensitive to measurement noise in the reflectivities, transmissivities, and coating thickness. Our reflectivities and transmissivities were measured on a Lambda-900 UV/Visible spectrophotometer by a highly-experienced operator, and repeated several times to ensure accuracy. Coating thicknesses were measured by profilometry, and subsequently adjusted, within experimental errors, to improve the integrity of our inversions. Residual measurement noise and non-uniformities in actual coating thickness often create an indeterminism in n', the resolution of which requires highly-interactive inversion software and an expert user. Because of these factors, our approach possesses little potential for "turn-key" use. Nevertheless, it has demonstrated a particular robustness with regards to its determinations of n", and so has proven adequate to resolve the current theoretical/experimental contradiction.

5.3.1 Undoped Alq

Figure 20:
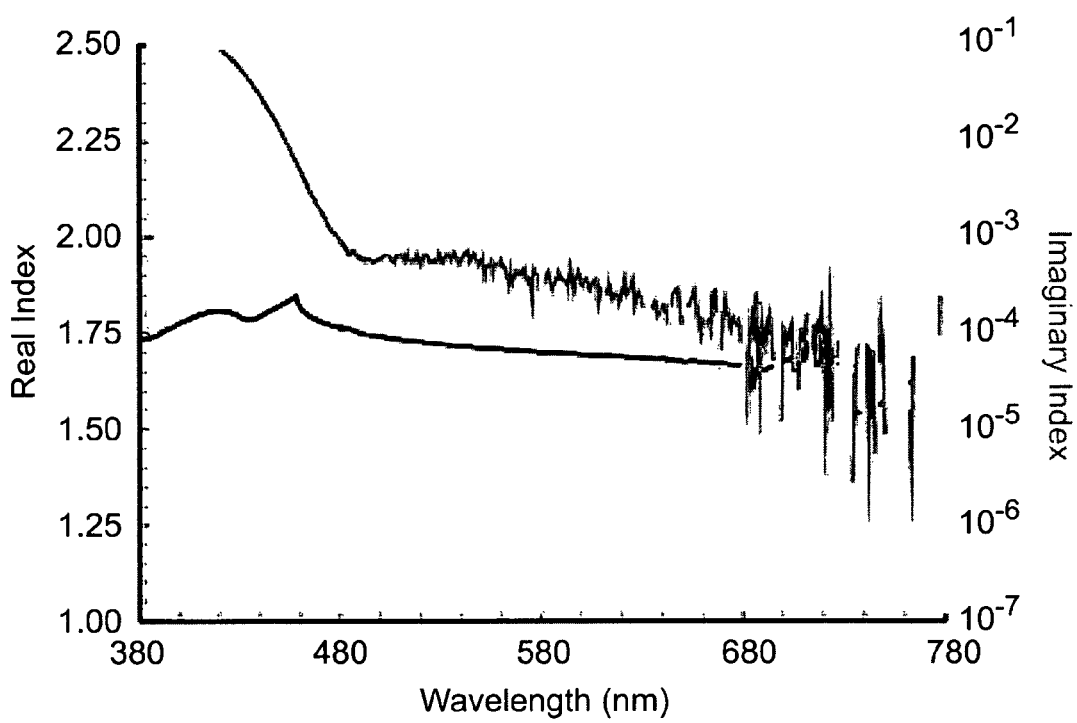
FIG. 20 is a graph of the complex index of undoped Alq.

FIG. 20 depicts the complex index of refraction of undoped Alq, as a function of wavelength within the visible, extracted from the measured reflectivities and transmissivities of a glass slide coated with a uniform 205-nm thick layer of this material.

The imaginary component indicates a strong damped resonance in the near UV. At wavelengths longer than 480 nm it has diminished below the "break point" for OLED light-emitting materials ($n" \sim 10^{-3}$), below which absorption does not substantially diminish device efficiency. Between 480 and 680 nm n" decreases by almost another order of magnitude, but with increasing relative fluctuations and dropouts indicating corruption by measurement noise. Within this regime we can discern trends in n", and the value, but only within approximately a factor of two. Beyond 680 nm we can conclude only that n" is of order $10^{-4}$ or less.

The real component increases with increasing wavelength beneath the strong near-UV absorption, and then generally monotonically decreases with increasing wavelength throughout the regime of low absorptivity. This is as expected for a single-oscillator model of the index. We assert that the "hiccup" in n' between 430 and 470 nm is an artifact of locally-systematic measurement noise coupled with a particular insensitivity of the interfacial reflectivity to n' in this regime of wavelengths. The true index of the sample is the inflection-free curve formed by connecting the increasing segment below 430 nm with the decreasing segment above 470 nm using monotonic negative curvature. Similarly, the fluctuations in n' above 680 nm are the result of random measurement noise. The true index is the extrapolation of the nearly linearly-decreasing curve between 500 and 680 nm.

Measured emission spectra of undoped-Alq devices invariably peak near 530 nm, and effectively vanish for frequencies corresponding to free-space wave-lengths greater than approximately 450 nm. Our refined measurements of n" indicate a loss tangent less than $10^{-3}$ at 530 nm, and less than $10^{-2}$ for all wavelengths greater than 450 nm, consistent with the expectations of our model.

5.3.2 Doped Alq

Figure 21:
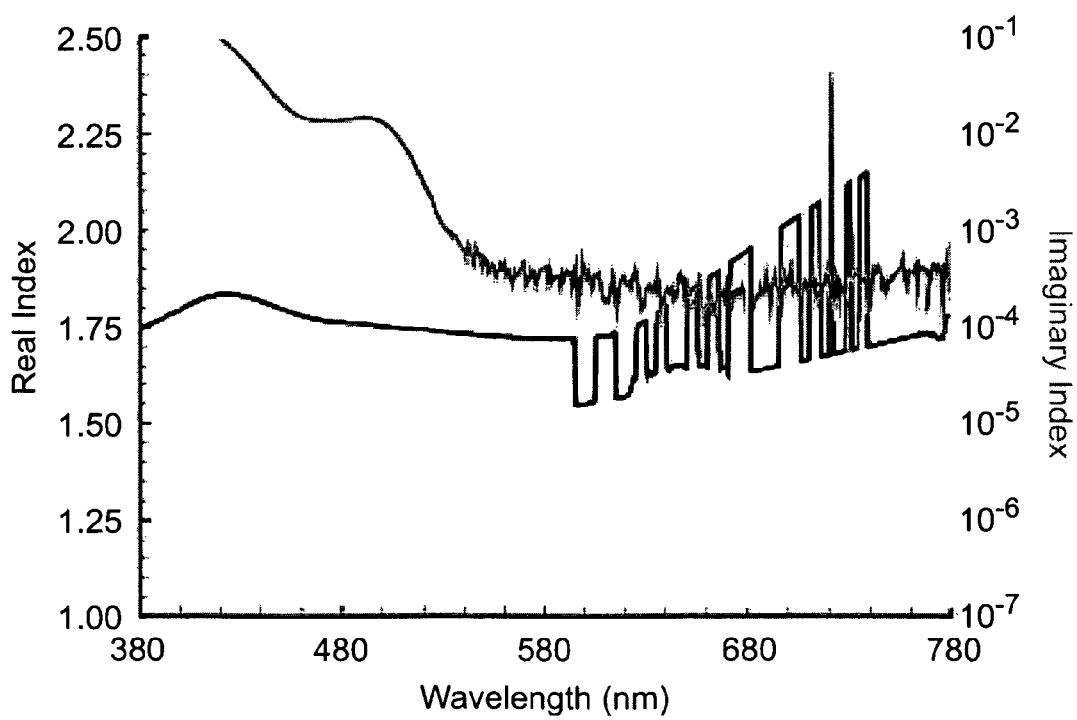
FIG. 21 is a graph of the complex index of Alq doped with one percent C545T.

FIG. 21 depicts the index extracted from the measured reflectivities and transmissivities of a slide coated with a 190-nm thick layer of Alq containing one percent of the emission-enhancing dopant C545T.

The imaginary component indicates the same strong near-UV resonance as is evident for undoped Alq in FIG. 20—the doped and undoped values are virtually identical below 430 nm. Between 430 and 530 nm, the doped sample exhibits a second resonance near 500 nm which is absent for undoped Alq. This is due to C545T. Beyond 530 nm, the imaginary component diminishes below the break point. Between 530 and 660 nm it exhibits a decreasing trend nearly identical in slope and mean value to that of undoped Alq. Beyond 660 nm it plateaus near $n" \approx 2 \times 10^{-4}$, while that of undoped Alq falls slightly below the noise floor at $n" \approx 1 \times 10^{-4}$. The significance of this second distinction, occurring so close to the noise floor, is questionable.

The real component is very nearly identical to the smoothed version of that for undoped Alq, except in the regime 590 to 760 nm. Here it oscillates randomly between radically-different values which, however, bracket the smoothed version for undoped Alq of FIG. 20. The oscillations occur due to the close proximity of three near roots throughout this wavelength regime, resulting in a broad depression in the metric Q we minimize for root finding, and the tendency of the minimization to converge to shallow minima within the depression occurring near one end or the other. For each wavelength the true index occurs near either the right (at 590 nm) or left (at 760 nm) edges of the broad depression, with a value of Q only marginally larger than that toward which the minimization gravitates. The true index of doped Alq within this regime is virtually identical to the smoothed version for undoped Alq—that is, slowly monotonically decreasing from 400 to 780 nm.

We have no measured emission spectra available for doped Alq devices, but we may anticipate the following differences relative to undoped devices. The blue edge of the band should shift to approximately 510 nm, and the peak emission should occur at wavelengths greater than or equal to 530 nm. These features are expected to depend critically upon the concentration of the C545T dopant. Higher concentrations should shift both the edge and the peak to the red. Sufficiently-high concentrations will squelch emission at wavelengths significantly greater than 530 nm, at which point the dopant may become a detriment as opposed to a benefit.

What is claimed is:

1. A computer-implemented method for determining an indication of an organic light emitting diode (OLED) device performance based upon a computerized model, the OLED device including an OLED stack having active layers between an encapsulant and an electrode and having an encapsulant-air interface on a side opposite the electrode, the method comprising:
   receiving input values of parameters relating to an operation or a characterization of the OLED device, the parameters including a structure of the active layers, an index of refraction of the active layers, an orientation and depth of dipoles in the active layers, and an index of refraction of the encapsulant;
   processing the input values according to a computerized model in order to determine an efficiency of the OLED device and an angular distribution of emission into air at the encapsulant-air interface, the processing comprising:
- determining an actual emission of the OLED stack into the encapsulant as an exact solution of Maxwell's equations for electric dipole sources within a coherent layered medium;
- determining a power consumed to create the emission as an exact evaluation of Poynting's integral for oscillating electric dipoles within the coherent layered medium;
- determining an efficiency of the emission of the OLED stack into the encapsulant by calculating the emission divided by the power consumed; and
- determining an efficiency of an emission of the OLED stack into air as a matrix solution of the Radiative Transfer Equation within the encapsulant given the efficiency of the emission into the encapsulant and a bidirectional scattering distribution function of the encapsulant-air interface; and
- outputting values providing a prediction of the efficiency of the emission from the device into air and an angular distribution of the emission into air based upon results of the processing step.

2. A computer program product storing an application for determining an indication of an organic light emitting diode (OLED) device performance based upon a computerized model, the OLED device including an OLED stack having active layers between an encapsulant and an electrode and having an encapsulant-air interface on a side opposite the electrode, the application comprising:
- a receive module, configured to control the computer, for receiving input values of parameters relating to an operation or a characterization of the OLED device, the parameters including a structure of the active layers, an index of refraction of the active layers, an orientation and depth of dipoles in the active layers, and an index of refraction of the encapsulant;
- a process module, configured to control the computer, for processing the input values according to a computerized model in order to determine an efficiency of the OLED device and an angular distribution of emission into air at the encapsulant-air interface, the process module comprising modules configured to control the computer for:
  - determining an actual emission of the OLED stack into the encapsulant as an exact solution of Maxwell's equations for electric dipole sources within a coherent layered medium;
  - determining a power consumed to create the emission as an exact evaluation of Poynting's integral for oscillating electric dipoles within the coherent layered medium;
  - determining an efficiency of the emission of the OLED stack into the encapsulant by calculating the emission divided by the power consumed; and
  - determining an efficiency of an emission of the OLED stack into air as a matrix solution of the Radiative Transfer Equation within the encapsulant given the efficiency of the emission into the encapsulant and a bidirectional scattering distribution function of the encapsulant-air interface; and
- an output module, configured to control the computer, for outputting values providing a prediction of the efficiency of the emission of the device into air and an angular distribution of the emission into air based upon results of the process module.

3. A computer-implemented method for determining an indication of an organic light emitting diode (OLED) device performance based upon a computerized model, the OLED device including an OLED stack having active layers between an encapsulant and an electrode and having an encapsulant-air interface on a side opposite the electrode, the method comprising:
- receiving input values of a plurality of parameters relating to an operation or a characterization of the OLED device, the parameters including a structure of the active layers, an index of refraction of the active layers, an orientation and depth of dipoles in the active layers, and an index of refraction of the encapsulant;
- processing the input values according to a computerized model in order to determine an efficiency of the OLED device and an indication of how at least one of the parameters affects the efficiency of the OLED device, the processing comprising:
  - determining an actual emission of the OLED stack into the encapsulant as an exact solution of Maxwell's equations for electric dipole sources within a coherent layered medium;
  - determining a power consumed to create the emission as an exact evaluation of Poynting's integral for oscillating electric dipoles within the coherent layered medium;
  - determining an efficiency of the emission of the OLED stack into the encapsulant by calculating the emission divided by the power consumed; and
  - determining an efficiency of an emission of the OLED stack into air as a matrix solution of the Radiative Transfer Equation within the encapsulant given the efficiency of the emission into the encapsulant and a bidirectional scattering distribution function of the encapsulant-air interface; and
- outputting values providing a prediction of the efficiency of the emission from the device into air and an indication of how the least one parameter affects the efficiency of the emission of the device into air based upon results of the processing step.

* * * * *

UNITED STATES PATENT AND TRADEMARK OFFICE
CERTIFICATE OF CORRECTION

PATENT NO. : 7,801,716 B2
APPLICATION NO. : 11/290767
DATED : September 21, 2010
INVENTOR(S) : David G Freier It is certified that error appears in the above-identified patent and that said Letters Patent is hereby corrected as shown below:

Column 6
Line 13; delete "11.50" and insert -- 1.50 --, therefor.

Column 11
Line 29-31; delete " $\left(\frac{n_d}{n_a}T^{(b)}\right)$ " and insert -- $\left(\frac{n_b}{n_a}\underline{T}^{(b)}\right)$ --, therefor.

Column 24
Line 34; delete "heterogeneties" and insert -- heterogeneities --, therefor.

Signed and Sealed this
Twelfth Day of April, 2011

David J. Kappos
*Director of the United States Patent and Trademark Office*